June 5, 1962  D. G. AID ET AL  3,037,382
VISUAL CONTACT ANALOG

Filed June 30, 1958  13 Sheets-Sheet 1

INVENTORS.
DOUGLAS G. AID
GEORGE H. BALDING
BY

ATTYS.

INVENTORS.
DOUGLAS G. AID
GEORGE H. BALDING

BY

ATTYS.

Fig. 2
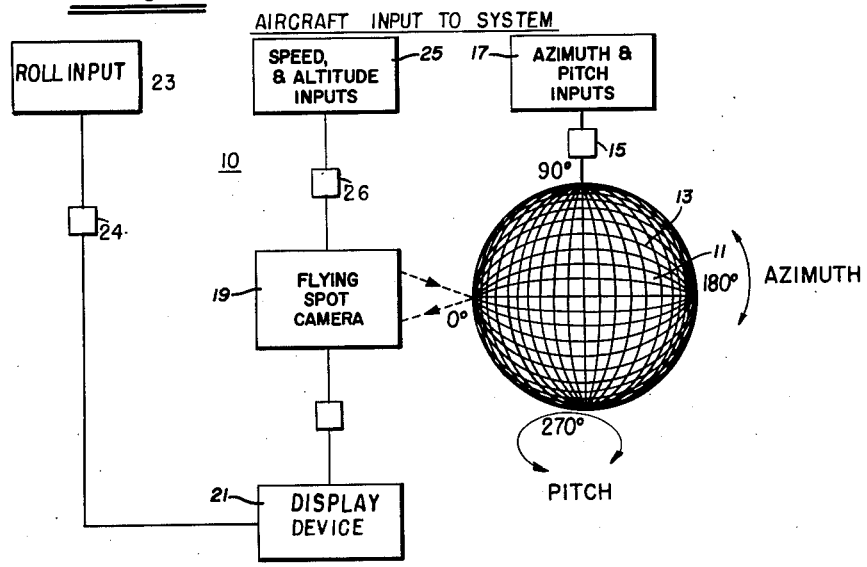
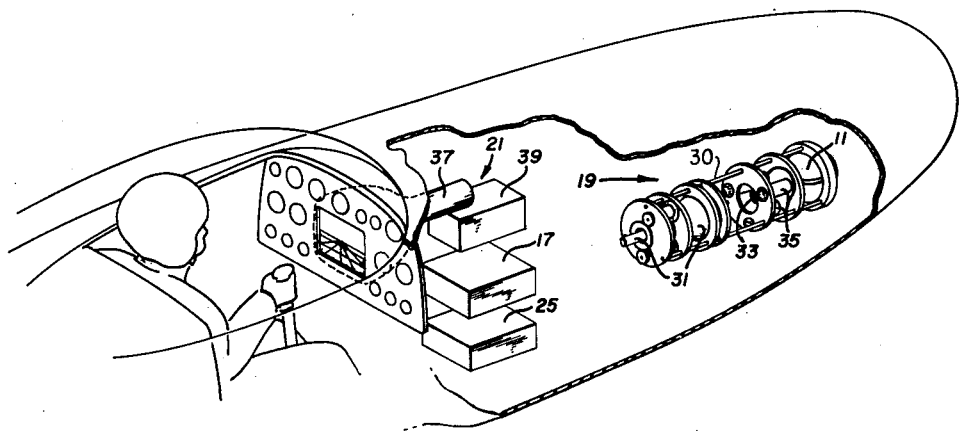
Fig. 3
INVENTORS.
DOUGLAS G. AID
GEORGE H. BALDING
BY
ATTYS.

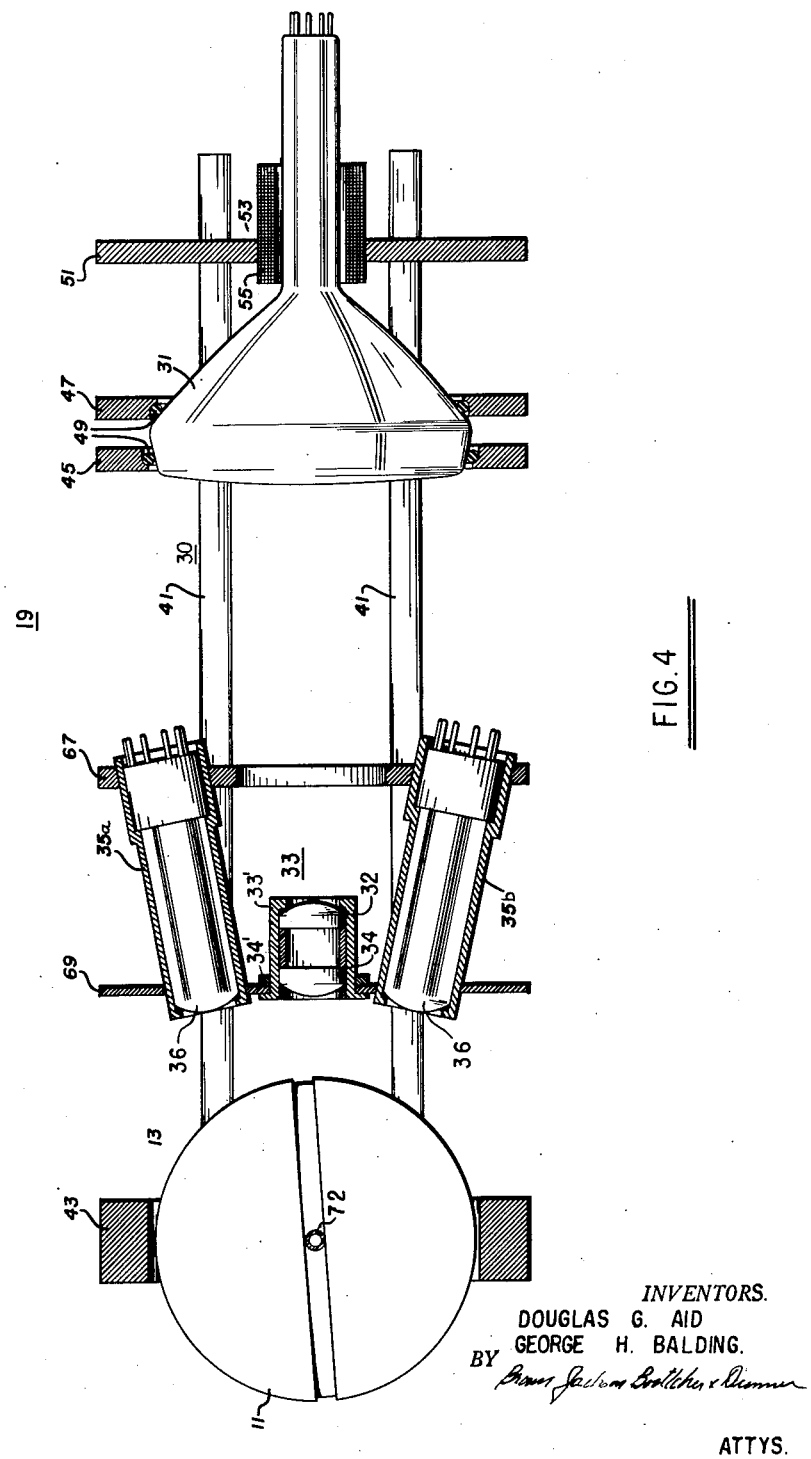

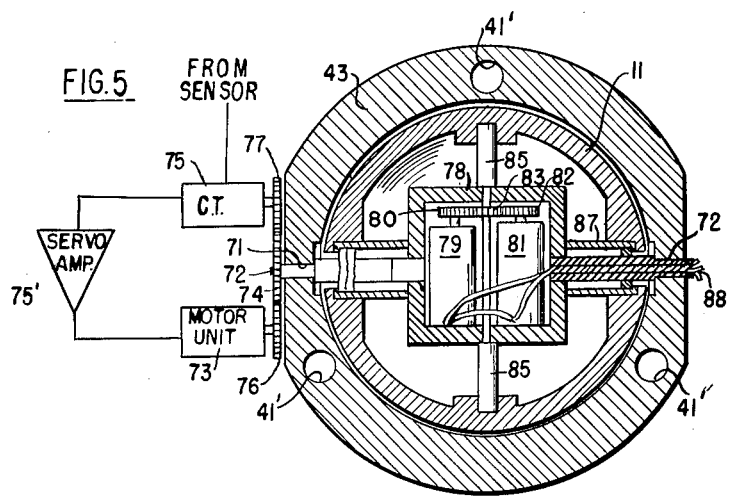
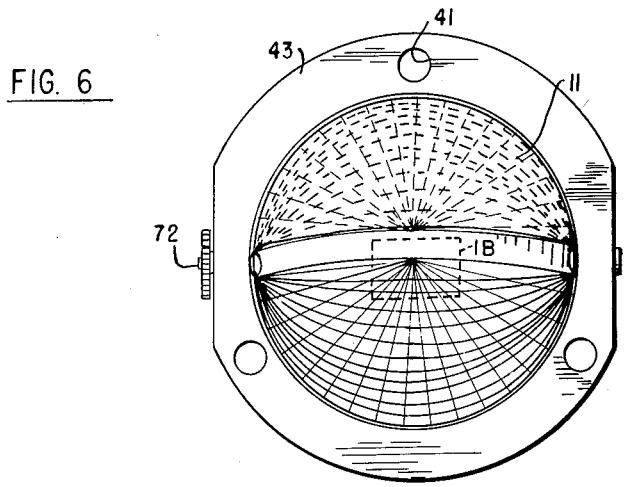
INVENTORS.
DOUGLAS G. AID
GEORGE H. BALDING

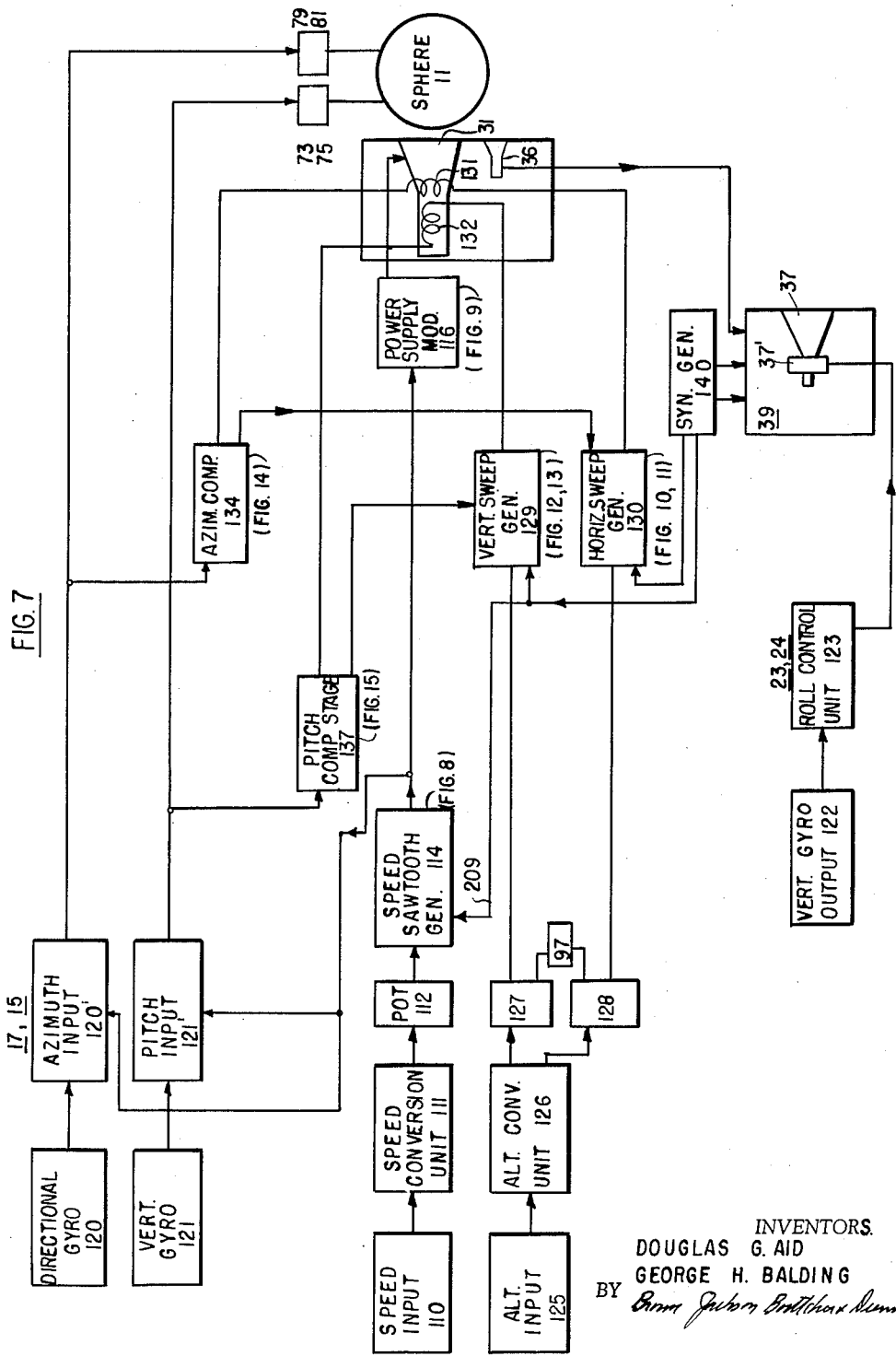

June 5, 1962

D. G. AID ET AL 3,037,382

VISUAL CONTACT ANALOG

Filed June 30, 1958

INVENTORS.
DOUGLAS G. AID
GEORGE H. BALDING

BY

ATTYS.

INVENTORS.
DOUGLAS G. AID
GEORGE H. BALDING
BY
ATTYS.

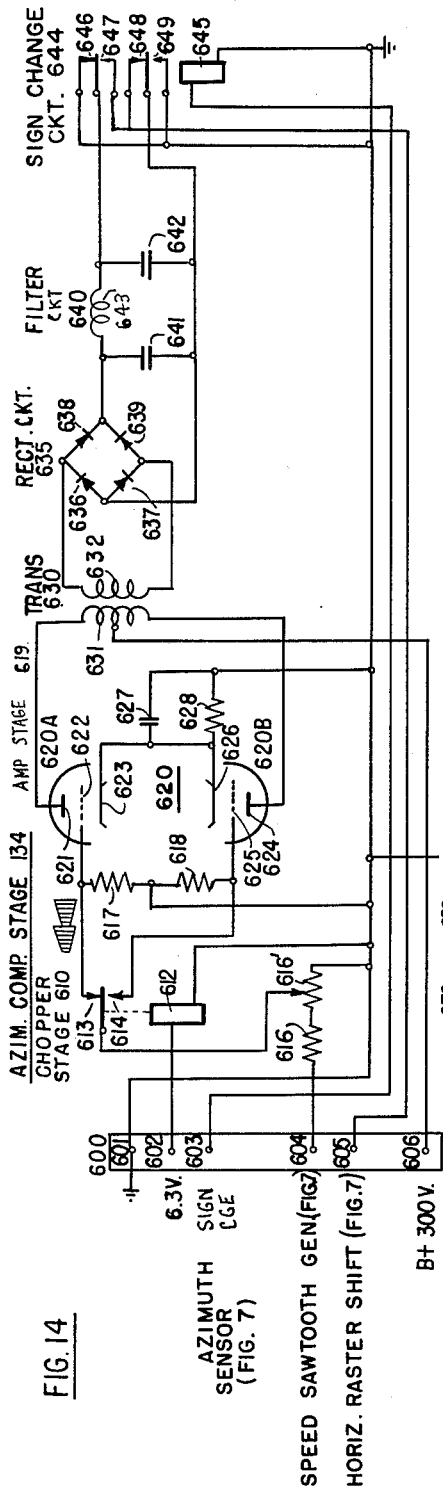
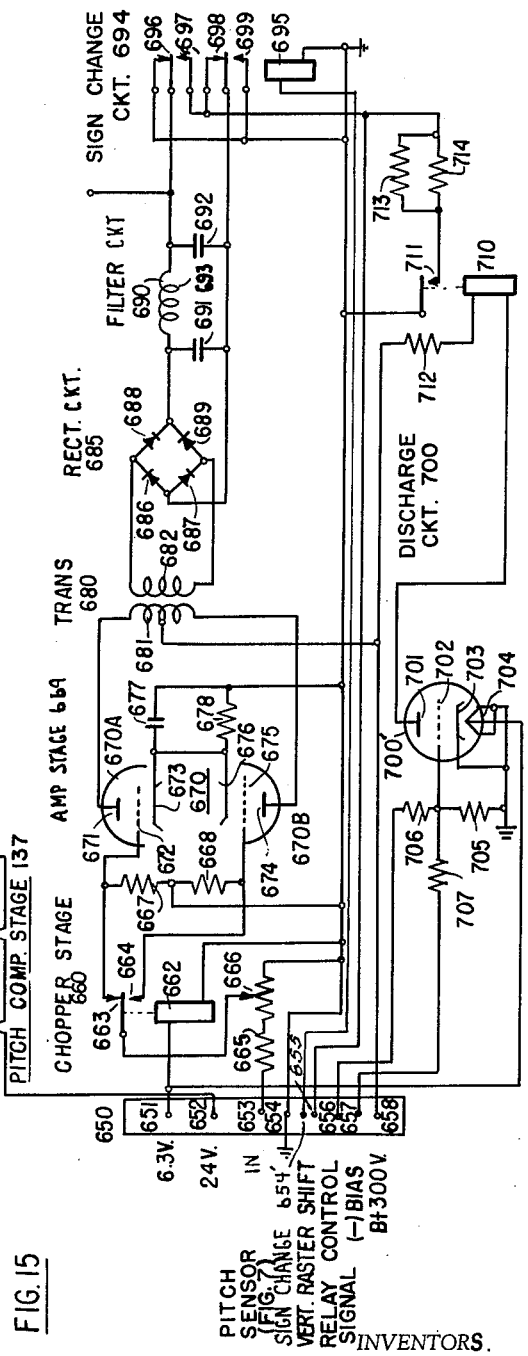
FIG. 14
FIG. 15
INVENTORS.
DOUGLAS G. AID
GEORGE H. BALDING
BY
ATTYS.

United States Patent Office 3,037,382
Patented June 5, 1962

3,037,382
VISUAL CONTACT ANALOG
Douglas G. Aid, Palo Alto, and George H. Balding, Niles, Calif., assignors to Kaiser Industries Corporation, Oakland, Calif., a corporation of Nevada
Filed June 30, 1958, Ser. No. 745,472
26 Claims. (Cl. 73—178)

This invention is directed to a visual contact analog, and more particularly to a device for presenting visual indications or cues of pertinent aircraft information to the pilot during flight. More specifically, this invention is directed to apparatus for providing to the aircraft pilot a moving integrated pictorial image which is indicative of the speed, heading, altitude and pitch and roll attitudes of an aircraft to permit control thereof by the pilot without direct visual reference to the earth's surface.

As a result of the rapid advancements in the aviation field within the last several decades, aircraft have assumed an increasingly important role in the military and commercial fields. With the current development of new sources of power such as jet and atomic engines, the progress and defense of the nation becomes more and more dependent upon such type equipment. Since the value of aircraft equipment is dependent in a large measure upon the manner in which the pilot maneuvers the aircraft, it is essential that the pilot be fully informed at all times of the basic flight information relative to aircraft altitude and position relative to the earth's surface, and particularly at such times as visual contact with the earth's surface is not possible because of operating conditions.

At the present time, only limited equipment is available for use in presenting such information to the pilot, and the information which is provided is presented in such manner as to render extremely difficult, the assimilation thereof for flight without visual contact to the earth. In known arrangements, for example, assimilation of pertinent information relative to the flight conditions of a craft requires that the pilot simultaneously read an air speed indicator, a gyrocompass, a rate of climb indicator, a bank and turn indicator, and then mentally correlate all of this data to determine his flying attitude and direction. Such task is extremely difficult under any set of conditions. Moreover such task is even more complicated in known installations for the reason that the instruments of different sizes and shapes are spread across the instrument panel, and the instruments pertaining to flight altitude, etc., are mounted on a common instrument panel which includes a large number of instruments which provide other types of information such as engine heat, engine pressure, etc. Thus in addition to the mental concentration required, the arrangement requires movement of the eyes across the instrument panel to obtain the data from which the mental calculation may be made. Even without the added excitement and strain of combat conditions, this problem of concentration, correlation, and assimilation is a difficult and time consuming operation. It is apparent that such requirement in an aircraft which operates at the new higher speeds, such manner of operation may require an added time interval for assimilation which might well prove fatal.

Research studies relative to such problem have indicated that the over-all response time of a pilot to a situation consists of the data acceptance time plus the reaction time required to initiate the corrective action. The reaction time is a property of the individual and cannot be materially decreased once the individual is selected and trained. The data acceptance time, however, depends upon the number of separate inputs and the time required for the integration thereof. Each of these time factors may be decreased by the provision of integrated instrumentation, and particularly by the provision of instrumentation which presents the information in a form which is related to the manner in which the human operator is accustomed to accepting such information in the real world.

It is a primary object of the present invention therefore to provide apparatus which is capable of presenting all of the information and data required for blind flying data in a single integrated display, and particularly to provide a visual indication analog which provides a graphic representation consisting of a grid line pattern, or other like pattern, which simultaneously indicates the altitude, speed, direction, and the pitch and roll attitude of the aircraft to the pilot.

It is a further object of this invention to provide information of such type in the form of a continuously moving perspective picture so that a pilot will be able to fly blind and recognize changes in pitch, roll, and azimuth, and in addition, the speed and altitude of the aircraft.

It is a further object of this invention to provide means for generating a video grid line display comprising a continuous simulated perspective picture which indicates changes in the pitch, roll, and azimuth heading of an aircraft, and which also includes a moving pattern, the rate of movement being related to the aircraft speed and the relative size of the pattern components being related to the aircraft altitude.

The problem of integrating multiple sets of information displayed on a number of separate indicators finds its counterpart in many industrial applications, and it is an additional object of this invention therefore to provide apparatus which minimizes the integration time for dfferent sets of information by providing a grid line pattern which appears to move across the display device in a continuous manner including means for changing the rate of movement to represent changes in a first predetermined set of data; and means for changing the number of grid lines and the relative disposition thereof in the pattern to represent changes in a second predetermined set of data.

Additional objectives and features of the invention will appear from the following description in which the preferred embodiments of the invention have been set forth in detail in conjunction with the accompanying drawings.

In general, the method and apparatus employed herein involves the projection of a readout raster on the grid surface of a rotatable sphere, which sphere is adjusted to different positions relative to the readout raster in accordance with changes in the value of the azimuth and pitch information supplied thereto. Electronic means control the size and shape of the raster image as projected on the sphere, changes in speed and altitude being integrated into the system by electronic adjustment of the readout raster image. Electronic means couple the information represented by the readout raster and the sphere to a display device, such as a cathode ray tube, and changes in the roll attitude of the aircraft are coupled to the yoke of the display device. Briefly stated, the sphere is moved responsive to changes in pitch and azimuth of the aircraft; representations of speed and altitude are established by electronic adjustment of the shape of a readout raster projected on the sphere; the resultant image on the sphere is displayed on a screen as an integrated video picture; and such picture is rotated on the final display screen in accordance with the position of the aircraft about its roll axis. Thus the final picture embodies all of the required intelligence concerning the speed, altitude, direction, pitch, and roll of the aircraft.

The foregoing objects and features of the invention, and others, which are believed to be new and novel in the art are set forth in the following specification, claims and drawings, in which:

FIGURES 1a–1p depict electronic raster adjustments effected to accomplish the different data displays of FIGURES 1A–1P;

FIGURE 2 is a schematic diagram setting forth the basic components for integrating the information into a common display according to one embodiment of the invention;

FIGURE 3 is an isometric drawing showing the relative position of the basic components in one typical aircraft installation;

FIGURE 4 is a side view of the sphere and flying spot camera equipment of the system shown schematically in FIGURE 3;

FIGURE 5 is a cross-sectional view of the sphere;

FIGURE 6 is a front view of the sphere showing the relative location of the grid lines thereon;

FIGURE 7 is a schematic block diagram of the circuit components of the novel system;

FIGURES 8 and 9 are schematic drawings of the electronic control circuits for controlling changes in the raster size and the rate of change of the raster size to introduce information relating to the aircraft speed into the integrated display;

FIGURES 10, 11, 12 and 13 are schematic drawings of the electronic control circuits for effecting changes in the raster size and shape to introduce information relative to the aircraft altitude into the integrated display; and FIGURES 14 and 15 are schematic showings of control circuits for introducing compensating signals into the control circuits for the horizontal and vertical deflection coils of the flying spot scanner to maintain a consistent speed showing with changes in azimuth and pitch, respectively.

GENERAL DESCRIPTION

The integrated instrumentation system basically comprises an arrangement wherein a number of separate inputs are effectively displayed as a pattern on the screen of a display device, which pattern is related to the information which would be viewed by the pilot during periods of visual contact with the earth's surface and sky. In the system herein disclosed, the data presented in such display include a representation of the aircraft (a) relative speed, (b) relative altitude, (c) relative heading, (d) relative roll attitude and (e) relative pitch attitude.

Figure 1A:
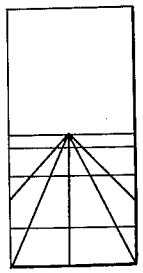
FIGURES 1A–1P are pictorial views of the patterns provided on the display screen to represent the different conditions of the aircraft attitude in one embodiment set forth herein.
Figure 1A:
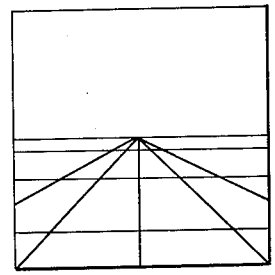
Figure 1B:
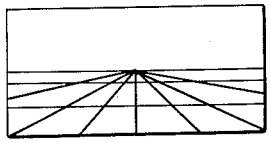
Figure 1B:
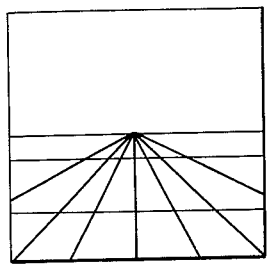
Figure 1C:
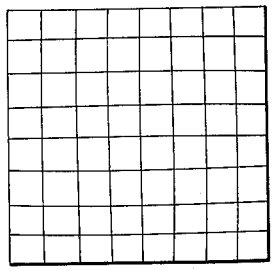
Figure 1C:
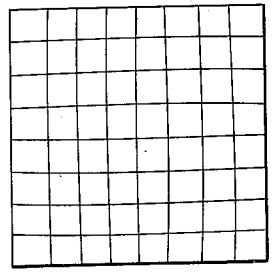
Figure 1D:
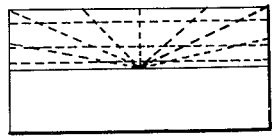
Figure 1D:
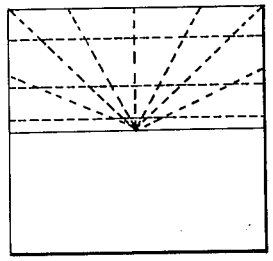
Figure 1E:
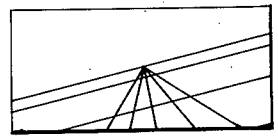
Figure 1E:
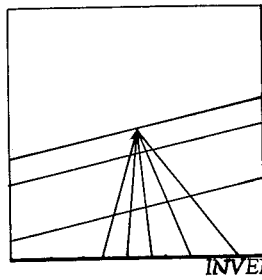
Figure 1F:
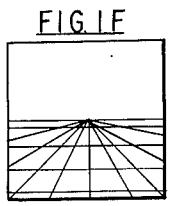
Figure 1G:
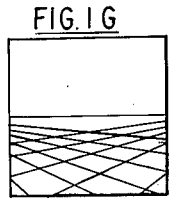
Figure 1H:
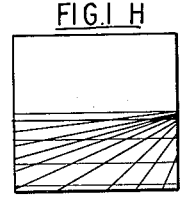
Figure 1K:
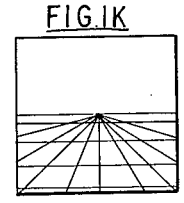
Figure 1L:
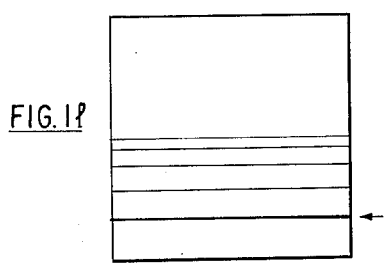
Figure 1L:
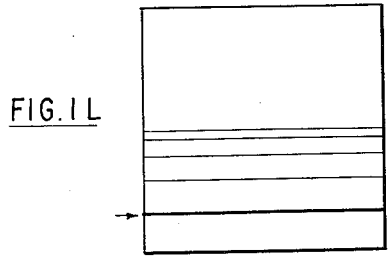
Figure 1M:
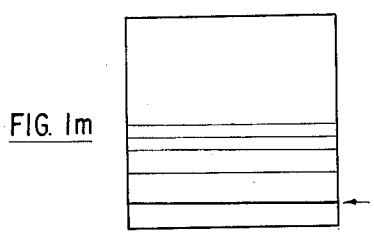
Figure 1M:
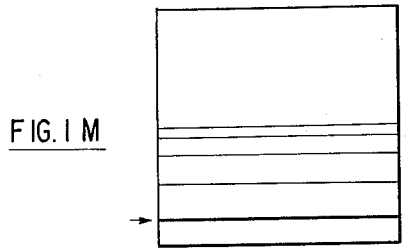
Figure 1N:
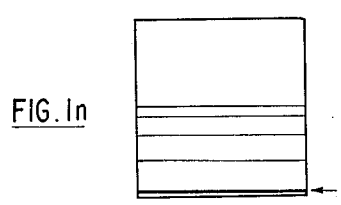
Figure 1N:
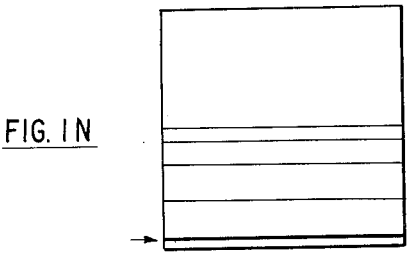
Figure 1P:
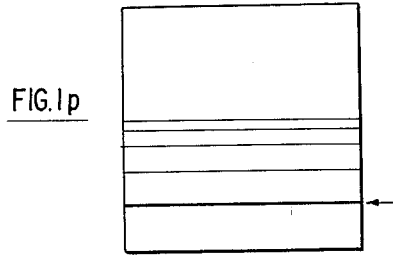
Figure 1P:
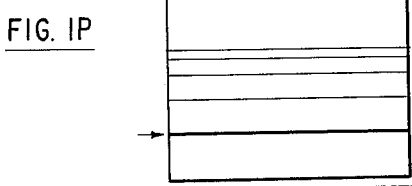

With reference to FIGURES 1A–1P, the displays provided to the pilot on the display device by the contact analog system with different conditions of flight is shown thereat, the FIGURES 1a–1b, etc., setting forth the relative raster adjustment effected to obtain such output. In normal level flight at a low altitude, for example, the system, as shown in FIGURE 1A, provides a pattern which consists of a first set of path defining lines which appear to converge toward a point on the horizon, and a set of horizontal grid lines which intersect the first set of lines at increments which are successively reduced in value as the lines approach the horizon. The grid line representation as thus provided is comparable to the pattern which would be observed by the pilot of an aircraft flying over flat farm land which is sectioned into square lots. In actual practice, each grid block may be related to a square mile area.

An increase in the altitude of the aircraft is represented by a narrowing of the flight path and an increase in the distance between successive horizontal lines, as shown in FIGURE 1B. Ostensibly, as the aircraft is farther from the earth, the pilot will see a smaller number of cross grid lines and a narrow path, and the contact analog provides such display to the pilot.

As the aircraft pitch is changed, as for example, in the direction of a diving attitude, the horizon on the contact analog is moved towards the top marginal edge of the display device, and the grid blocks become more and more square in shape. As shown in FIGURE 1C, as the aircraft is placed in a vertical dive, a set of substantially square grid blocks will be presented on the contact analog display, the size of the blocks being increased as the altitude of the aircraft decreases. In the event that the aircraft is placed in a climbing attitude, the grid pattern in the sky will appear as a broken line display as shown in FIGURE 1D, the broken line indicating the sky as opposed to the solid line showing for the earth.

As the aircraft is banked, as for example, in the execution of a roll, the horizon on the presentation is tilted through an angular increment which is proportional to the rotation of the aircraft about its roll (fore and aft) axis. The resultant presentation in the initial stages of a roll of the aircraft to the right is shown in FIGURE 1E.

In the event that the aircraft heading is changed from a first cardinal point heading shown in FIGURES 1A–1B through ninety degrees to a second cardinal point, the display presentation is incrementally shifted, certain of the stages in the shift being shown in FIGURES 1F–1K.

The representation of speed is effected as shown in FIGURES 1L–1M, such representation being obtained by generating a display which gives the impression of forward motion to the observer. As shown in more detail hereinafter, in level flight on the heading of FIGURES 1A, 1B, each horizontal line appears to be generated on the horizon, and to move continuously downward across the screen until it disappears from view at the bottom edge of the display, the rate of movement across the screen being related to the aircraft speed.

Thus the contact analog of a moving aircraft consists of a dynamic display with a complete continuity of motion wherein the different separate inputs are combined into a single integrated moving display which is related to true life conditions. The novel system for accomplishing such displays is now set forth hereat.

SYSTEM COMPONENTS

The basic elements of one preferred embodiment of the visual contact analog of the invention are shown in FIGURE 2. As there shown, the contact analog 10 includes a rotatable sphere 11 having its outer surface divided into a plurality of sections by grid lines 13, each of which grid lines is a great circle of the sphere. The sphere as viewed from the top locates four major or cardinal points, 0°, 90°, 180°, and 270°, each great circle line on the sphere passing through at least a pair of the image points as more fully described hereafter. By suitable means, indicated by line 15 in the schematic showing of FIGURE 2, the sphere is mechanically rotated to different positions as sensor means 17 indicate changes in aircraft heading and pitch thereto. A flying spot camera 19 positioned adjacent the sphere or memory device 11 projects a controlled raster on the sphere 11, the size, shape and position of the raster being determined by the value of the signals which are coupled to the flying spot camera 19 by sensor means 25 and signal generator means 26 which provide input signals related to the speed and altitude of the aircraft thereto. Readout or pickup means associated with the flying spot camera 19 transmit the information integrated into the raster area to an associated display unit 21. The picture on the display unit 21 is rotated relative to the horizontal by translator means 24 in a manner determined by signals derived from the roll input 23 which senses changes in the attitude of the aircraft relative to the roll axis.

Flying spot cameras, such as camera 19, are well known in the television art, and basically consist of a flying spot scanner tube and a photomultiplier tube. The flying spot scanner tube, in operation, traces a fine spot of light across a given area, the shape and size of which are determined by the value of the signals input thereto. The area thus established in effect constitutes a window through which the memory device or sphere 11 is viewed, and such area is, at times, referred to hereinafter as the readout area. Since the flying spot camera 19 is fixedly positioned relative to the rotatable sphere 11, correspondingly different sections on the sphere are presented to the readout area as the sphere 11 is turned about its vertical axis and its horizontal axis responsive to changes in the heading and of the pitch of the aircraft respectively. The raster area which is illuminated by the flying spot camera as it traces its path across the face of the grid lines on the sphere is electronically varied as the altitude and speed of the aircraft is changed to thus effect a corresponding change in the image presentation on the display device.

The readout area which is traced on the sphere is reflected into a photomultiplier tube which couples the same to the display unit 21 for reproduction purposes. In the present disclosure, display unit 21 is illustrated as comprising a television display chassis 39 and associated cathode ray tube 37 which is connected for synchronized operation with the flying spot camera 19. It is obvious, however, that other forms of display devices of the gaseous, vacuum and solid state types may be used therewith.

MOUNTING OF SPHERE 11 AND CAMERA 19

The specific position of the different components in one preferred installation will be apparent with reference to FIGURE 3. As there shown, the flying spot camera 19 described in connection with FIGURE 2 comprises a flying spot scanner tube 31, a lens set 33, and a set of three photomultiplier tubes 35 supported in a predetermined spaced relation relative to each other and sphere 11 by a common support device 30. The flying spot scanner tube 31 and lens set 33 which are fixedly mounted relative to rotatable sphere 11, focus the flying spot beam on an area of the sphere 11 which is determined by the nature of the signals input to the control elements of tube 31. The light reflected from the readout area on the sphere is picked up by three (3) photomultiplier tubes 35 mounted adjacent the sphere and coextensively with the lens 33, and is supplied to a display unit 21 which, as shown in FIGURE 2, comprises a cathode ray tube 37 mounted in the cockpit which is for convenient viewing by the pilot. Ostensibly the camera 19, the control chassis 39 for cathode ray tube 37, and the sensor means 17, 23, 25 may be located at various positions in the aircraft which do not interfere with the pilot's movements. The contact analog has proven especially successful in its use with a so-called thin transparent display tube which is mounted in the cockpit windshield in the direct line of vision of the pilot. However, the unit has like application in use with conventional display devices of the type shown in FIGURE 3.

The unit chassis for the flying spot camera 19, which is shown isometrically in FIGURE 3, is shown in greater detail in FIGURE 4, and as there illustrated is assembled with the portions thereof held in accurate co-relationship by the support means 30 which includes three tubular support rods 41 which extend for the length of the chassis. An annular support member 43 is fixedly attached to one end of the rods 41 to provide a fixed support for one axis of the sphere 11, such axis comprising a laterally extending support shaft 72 which is carried by bearings located in apertures in the support member 43. The support mountings for sphere 11 are described in greater detail in connection with FIGURE 5, it being apparent from the showing of FIGURE 4 that the sphere is free to rotate about the illustrated shaft 72. The flying spot scanner tube 31 is mounted on the opposite end of support rods 41 by means of annular rings 45 and 47 which are in turn fixedly positioned on and attached to the rods 41. Annular rings 49 of rubber, or other cushioning material, provide a tight and cushioned fit with the outer diameter of tube 31 to fixedly position the same in the rings 45 and 47 relative to sphere 11.

A further support plate 51 is fixedly positioned on rods 41 rearwardly of the support rings 45, 47 for the tube 31, and is provided with an annulus 53 which is of a diameter sufficient to receive yoke coil 55 therethrough in a supporting manner. The yoke coil 55 in turn encompasses the neck of the flying spot scanner tube 31.

The three photomultiplier tubes 35 are supported at their base ends by an annular ring 67 and at their opposite ends by plate 69, both of which are securely positioned on the rods 41. The photomultiplier tubes are fixedly supported by plates 67, 69 with the light sensitive ends thereof directed toward the sphere 11, and are aligned on approximately radii of sphere 11, although such alignment is not critical. Plate 69 also supports a lens set 33 along the central axis thereof to focus the flying spot of light from the flying spot scanner tube onto the surface of the sphere 11. Lens set 33 is of the ordinary condensing type, and its purpose is to condense the light from the flying spot scanner tube to a sharp point of focus on the surface of the sphere 11 to thus provide intense and pinpoint illumination of the surface and the grid lines 13 thereon. Lens set 33 can, for instance, include lens members 32 and 34 supported in a suitable housing 33' which is readily attached to the support plate 69. The fastening means in the illustrated example include a flanged end on housing 33' and an annular ring 34 having inner threads for engaging a set of threads on the outer circumference of housing 33' inwardly of the flanged end. Tightening of the annular ring 34' securely positions the lens housing 33' relative to plate 69 while yet permitting ready disassembly thereof. The lens set 33 may be of the type conventionally used in a photographic enlarger, in which case, in order to provide the proper condensing effect, the portion of the lens ordinarily turned toward the light source is in the present arrangement turned toward the flying spot scanner 31, and the opposite surface would be turned toward the sphere 11.

SPHERE CONSTRUCTION

A more detailed teaching of the specific manner of suspension and movement of the sphere 11 is provided with reference to the showing of FIGURE 5. As there shown, the support plate 43 locates apertures 41' for the purpose of receiving supporting rods 41 therethrough. Clamps or other suitable means (not shown) are used to fixedly position the sphere support plate 43 to the rods 41 as the desired relative position of the sphere 11, lens set 33 and tube 31 are determined. Bearing surfaces 71 in the plate are adapted to support the journal ends of shaft 72 to permit rotational movement of sphere 11 about the lateral axis established thereby. Shaft 72 at its center section is joined by an internal shell 78 which forms the housing for a drive motor 79 and a control sensor 81. Associated gear members 80, 82 on the motor and sensor respectively mesh with gear 83 on shaft 85 which extends outwardly of each end of shell 78 to provide a second supporting axis for the sphere 11.

The sphere 11, as shown, is formed of an upper and lower hemisphere which are hollow and of an increased thickness at the base to permit keying thereof to the respective ends of rotatable shaft 85. The mating ends of the hemispheres as assembled are disposed in spaced floating relation relative to an inner circular guide plate 87 which is fixedly attached to the outer periphery of the inner shell 78. The shaft portions 72 which support the assembly on support plate 43 extend outwardly from either side of the plate, one shaft portion at least being hollow, as indicated, to permit introduction of the conductor cables 88 for the motor 79 and sensor 81 into the confines of shell 78.

It is apparent from the foregoing description that the two hemispheres of the sphere 11 are free to rotate together about a vertical axis established by shaft 85 and about a horizontal axis established by shaft 72, it being understood that the terms vertical and horizontal are used with reference to the showing of FIGURE 4, and that such terms are not to be considered limiting with respect to the teaching of the invention. As shown hereinafter, changes in pitch are represented by rotation of sphere 11 about axis 72 and changes in azimuth are represented by rotation of the sphere about axis 85.

The sphere outer surface (as viewed from the top pole in FIGURE 2 and as viewed from one side in FIGURE 6) locates four poles, the poles being located at the 90° increments at the mating edges of the two hemispheres, as for example, 0°, 90°, 180°, 270°. A first major great circle line extends through the 0°, 180° poles, and a succeeding set of great circle lines pass through the same poles at successive angular increments to the left and to the right of the first major center line 0°–180°. A second major great circle line extends between the poles marked 90°–270°, and a second set of great circle lines are disposed to the right and left, respectively, of the second major great circle line to pass through the 90°–270° poles. In practice, the center lines of all lines are great circle lines, and the edges of all lines are great circle lines. Each of the great circle lines is defined as the intersection of a hemispherical surface with one of a family of plane surfaces passing through the opposite poles in the center of the hemisphere.

In a particularly successful embodiment, the sphere was made of aluminum material having a wall thickness of .125 inch, and the lines were imposed as a flat white designation on a flat black background. A set of dihedral angles utilized in such embodiment was as follows:

| Line Number | Nominal Center-line Angle, deg./min. | Thickness Angle, min./sec. | Line Number | Nominal Center-line Angle, deg./min. | Thickness Angle, min./sec. |
|---|---|---|---|---|---|
| 0 (edge) | 0/0 | 0/0 | 18 | 9/29.5 | ±3 |
| 1 | 1/00 | ±0/20 | 19 | 10/50 | ±3.5 |
| 2 | 1/08.5 | ±0/20 | 20 | 12/22 | ±4 |
| 3 | 1/18 | ±0/25 | 21 | 14/07 | ±4.5 |
| 4 | 1/29.5 | ±0/30 | 22 | 16/06.5 | ±5 |
| 5 | 1/42 | ±0/35 | 23 | 18/23 | ±6 |
| 6 | 1/56.5 | ±0/40 | 24 | 20/59 | ±7 |
| 7 | 2/13 | ±0/45 | 25 | 23/57 | ±8 |
| 8 | 2/32 | ±0/50 | 26 | 27/20.5 | ±9 |
| 9 | 2/53.5 | ±0/55 | 27 | 31/12.5 | ±10 |
| 10 | 3/18 | ±1.1 | 28 | 35/37.5 | ±11 |
| 11 | 3/46 | ±1.2 | 29 | 40/40 | ±13 |
| 12 | 4/18 | ±1.4 | 30 | 46/25.5 | ±15 |
| 13 | 4/54 | ±1.6 | 31 | 52/59.5 | ±17 |
| 14 | 5/35.5 | ±1.8 | 32 | 60/30 | ±20 |
| 15 | 6/23 | ±2.0 | 33 | 69/05 | ±24 |
| 16 | 7/17 | ±2.4 | 34 | 78/53 | ±26 |
| 17 | 8/19 | ±2.7 | 35 | 90/00 | ±29 |

Tolerances:
Angular measurements: ±20″ of arc.
Maximum width of tapered lines at poles not to exceed 0.0005 in.

In scribing the surface of this sphere, one-half of the sphere is marked with broken lines (see FIGURE 6) and the other half of the sphere is marked with solid lines.

The superimposed lines 1B in FIGURE 6 illustrate the particular area of the sphere which is subjected to readout by the flying spot camera during the condition of straight and level flight at a high altitude, it being apparent therefrom that the resultant display, as shown in FIGURE 1B, will be comprised of a horizon line extending laterally across the width of the screen and a series of horizontal lines spaced by increasing increments in the direction of the lower edge of the screen. A second set of lines which extend from the bottom edge of the screen at angles oblique to the horizontal lines appear to converge at a point on the horizon.

It is apparent from the foregoing description that changes in the aircraft flight condition are represented by changes in the display presentation, certain of such changes being effected by electronic means and others being accomplished by mechanical means. For purposes of simplicity of description, reference is first made to the changes which are accomplished mechanically.

Generation of Azimuth and Pitch Indications

Changes in heading of the aircraft are represented on the display device by effecting rotation of the sphere 11 about its vertical axis 85 through a corresponding angular distance. Such movement is accomplished by the motor 79 and sensing device 81 (which comprises a conventional synchro control transformer) through the gear trains 80, 82, 83, the input signals to the motor and control transformer being extended over the input cable 88 which is connected to the output side of conventional azimuth sensing equipment associated with the directional gyro on the aircraft. Thus a change in heading of the aircraft as coupled by the sensor equipment over cable 88 to motor 79 controls same to rotate shaft 85 and attached sphere 11 through a corresponding angular segment. Ostensibly, the execution of a complete circling turn would result in the rotation of the sphere through 360 degrees about its axis 85. Sensor device 81 returns a signal to the control equipment which is indicative of the angle of displacement, which signal is used to control motor 79 in the positioning of the shaft 85 to the position indicated by the input signal to the transformer 81 in the conventional manner of a synchro system.

The rotation of sphere 11 about the horizontal or lateral axis 72 is controlled by a motor unit 73 and sensor unit 75 which control the gear members 76, 77 attached to the respective shaft ends thereof in the rotational positioning of an associated gear member 74 attached to shaft end 72. The energizing circuit for the synchro control transformer 75 is connected to the output circuit of the "pitch" indicating system for the aircraft (the vertical gyro), and each change of attitude of the aircraft effects transmission of an informative signal to synchro control transformer 75 which responsively effects rotation of the shaft 72 by controlling the excitation of motor 73 through servo amplifier (75′) to operate through a corresponding angular increment. Gear 77 indicates to the control transformer 75, the degree of angular displacement as effected by the motor 73, and the transformer 75 continuously adjusts the signal to motor 73 until the shaft 72 is adjusted to the position indicated by the incoming signal. Ostensibly, if an outside loop is executed, the sphere 11 will be rotated about axis 72 through a full 360 degrees.

The resultant change in the segment of the sphere presented to the readout area established by the flying spot camera will be apparent with reference to FIGURE 6. Assuming initially, for purposes of example, that the readout area on the sphere for level flight at a relatively high altitude will be as shown by the window in FIGURE 6 and that the pattern reproduced on the display device will be that shown in FIGURE 1A. Assuming now that the attitude of the plane is changed to either a dive or climb attitude, the pitch control motor 73 will effect a corresponding adjustment of the sphere 11 upwardly or downwardly about horizontal axis 72. Ostensibly, if the plane is in a dive attitude the sphere is moved progressively upward to move the horizon higher and higher on the display device screen. If the angle of dive is sufficiently large, the sphere 11 is displaced to present the top portion thereof, as disclosed in FIGURE 2, and the display device screen is filled completely with the grid blocks, the blocks becoming more square in shape as the angle of dive increases (FIGURE 1C). Similarly if the plane assumes a climbing attitude, the sphere 11 is rotated in a downwardly direction to move the horizon displayed on the screen progressively lower and moves more and more of the broken grid lines (which indicate the sky—the solid grid lines indicating the earth's surface) into view in the readout area (see FIGURE 1D). Briefly stated, the location of the horizon on the screen and the shape and size of the grid blocks clearly and quickly indicate the angle of pitch of the aircraft to the pilot. In a similar manner as sphere 11 is rotated about vertical axis 85 to indicate changes in the heading of the aircraft, successively new sets of vertical lines are moved across the readout area as shown in FIGURE 1F–1K, the four different cardinal points being presented to the viewing area as a turn is executed through 360°.

It is apparent from the foregoing description that changes in azimuth as well as in pitch can be indicated simultaneously by relative movement of the sphere 11.

*Coupling of Azimuth, Roll, Pitch, Speed and Altitude Indications to Display Device*

The display image thus far described provides a visual indication of pitch and heading, which indications are basically provided by physical adjustment of the sphere around a first and second axis. The resultant display comprises a horizon and a set of grid blocks, the relative positions of which are varied on the display screen to cue the pilot as to the condition of pitch and azimuth. In addition to the foregoing information, the pilot must also know the relative speed and altitude as well as the relative roll attitude of the aircraft, and as now shown, the inclusion of such indications in the single image presentation is basically achieved by electronic adjustment of the readout raster, and adjustment of the yoke through 360° about the neck of the cathode ray display tube 37.

With reference to FIGURE 7, the block diagram there shown sets forth schematically the component equipment employed in the integration of the five sets of information required by the pilot for blind flying into a single pictorial presentation on a visual indication display device 37. As there shown, the azimuth and pitch signal indications are mechanically coupled to the control members 79, 81 and 73, 75 (FIGURE 4) respectively for sphere 11 by a set of servo mechanism systems 120′, 121′. Azimuth input means 120′, for example, are connected to couple a signal indication of the heading of the aircraft directional gyroscope 120 to the azimuth servo control members 79, 81 for the sphere and may comprise a conventional set of signal transmitting units available in the field, including a set of Kearfott equipment comprising a synchro control transmitter Model No. RS–911 connected to a synchro control transformer Model No. RS901 which, through amplifier Model No. T–3100, drives a motor generator Model No. R–309 (units 79 and 81 in FIGURE 4), rate damping feedback being provided by the generator section of R309 to drive the sphere in accordance with the signal output of the directional gyro 120. Other systems and components well known in the art may be employed in a similar manner.

In a similar manner the control means 121′ for coupling the output of the aircraft vertical gyroscope 121 to the pitch servo control members 73, 75 for the sphere 11 may comprise a set of three units available in the field, such as a Kearfott set including synchro-control transmitter Model No. R–512, the output of which is connected over a transformer Model No. R–502 and amplifier T3100 to a motor generator Model No. R309 (motor and sensor units 73, 75 in FIGURE 4) to drive the sphere 11 in accordance with the signal output of the vertical gyroscope 121.

As noted heretofore, the sphere 11 is rotated relative to a "readout" area which is projected thereon by flying spot scanner tube 31, the information in the readout area being in turn sensed by the pickup means 36 in unit 19 and coupled to chassis 39 for the display device 37. The changes in the roll attitude of the aircraft in the embodiment are effected by angular adjustment of the yoke coil 37′ on the display tube 37, and changes in speed and altitude are basically effected by adjustment of the size and shape of the raster projected by the flying spot tube 31 on the sphere 11.

*Generation of Roll Indications*

Adjustment of the yoke coil 37′ about the neck of the cathode ray tube 37 is accomplished in one embodiment by coupling the output signal of the aircraft vertical gyroscope 122 to a roll control unit 123 which may comprise a set of commercially available equipment, such as a Kearfott system including a synchro-control transmitter Model No. R512, the output of which is connected to a transformer Model No. R502 and servo amplifier Model No. T3100 to driving motor generator Model No. R309 in the adjustment of the relative position of the yoke coils 37′ on display device 37 in accordance with the indications provided by vertical gyroscope 121.

Rotation of the yoke 37′ through an angular increment which is related to the rotation of the aircraft about its fore and aft axis effects rotation of the raster on the screen through a similar increment, and causes the horizon on the screen to be slanted relative to the horizontal by a corresponding increment (FIGURE 1E). It is apparent that as a continuous roll is executed by the pilot, the yoke will be rotated through 360° about the neck of the cathode ray tube 37.

In a second embodiment, the roll indications may be generated by effecting a corresponding adjustment of the deflection yoke 55 on the flying spot scanner tube. The yoke coil in its rotation correspondingly alters the readout area of the flying spot scanner tube, and thereby adjustment of the horizon in a manner which is related to the degree of roll of the aircraft about its axis.

In such arrangement an effect, identified as skewing is experienced in the raster adjustment during the roll of the aircraft. Accordingly, a second or an inner yoke is nested within the illustrated coil 55, and a servo mechanism which responds to the roll of the aircraft supplies an empirical set of voltage signals to the horizontal and vertical deflection coils during the roll to maintain a rectangular readout area. Other similar methods of effecting skewing compensation will be apparent to parties skilled in the art.

*Generation of Speed Indications*

Changes in speed of the aircraft are reflected in the visual indications provided on the display device 37 in the present arrangement by coupling a signal indicative of the speed input 110 which is derived from a conventional air speed indicator to a speed conversion unit 111 and a potentiometer 112 which converts the linear mechanical input data to a set of exponential potential values as more fully explained hereinafter.

The exponential output of the potentiometer 112 is coupled to a speed sawtooth generator unit 114 which has a variable rate, constant amplitude sawtooth output, the duration of each sawtooth waveform in the output circuit thereby being varied in accordance with the value of the input signal coupled thereto. Briefly with an increase in the speed of the aircraft, the duration of the sawtooth is correspondingly reduced, and with a decrease in the aircraft speed, the duration of the sawtooth waveform output is correspondingly increased. In one embodiment, the sawtooth generator unit 114 was operative to provide a series of sawtooth waveforms in which the number of pulses was related to the mile per hour speed of the aircraft.

The waveform output of sawtooth generator 114 is coupled to a high voltage power supply modulator circuit 116 for increasing and decreasing the high voltage signal applied to the target of the flying spot scanner tube 31, the degree of expansion and contraction of the scanning raster being determined by the amplitude of the applied sawtooth voltage and the rate of expansion and contraction being varied by the duration of the sawtooth wave. As shown hereinafter expansion and contraction of the readout raster on the flying spot scanner creates the illusion of movement of the lines across the face of the display screen, the speed of movement of each line across the display being related to the aircraft speed and the duration of the sawtooth wave to thereby provide representations of a first translatory motion on the display screen.

Altitude Indication Generation

An additional representation of translatory motion is provided in the display by representative output signals of the aircraft altitude which are derived from the aircraft altimeter and coupled over an input circuit 125 to the altitude conversion unit 126 which, with the aid of potentiometers 127, 128 converts the linear signals to an exponential signal output and couples the same to the horizontal and vertical sweep generators 130, 129 respectively which in turn couple energizing signals to the flying spot scanner tube deflection coils 131, 132 to effect a corresponding adjustment of the shape of the raster applied to the sphere 11.

As shown hereinafter at lower altitudes for level flight conditions, the generators produce a narrow long raster which results in the presentation of an expanded path having a larger number of horizontal grid lines (FIGURE 1A). At progressively increasing values of altitude, a readout raster of correspondingly increased width and decreased height is provided, and a contracted pattern comprised of a larger number of vertical lines, and a smaller number of horizontal lines is provided (FIGURE 1B).

Indication Reproduction

The readout raster thus applied to sphere 11 is sensed by the photomultiplier tubes of camera 19, and fed through conventional amplifier stages to the grid input for the cathode ray tube 37. A conventional television receiver chassis 39 may be used for energization of the cathode ray tube 37, such unit being indicated schematically in FIGURE 7. A timing generator 140 is connected to synchronize the horizontal sweep generator and vertical sweep generator in the chassis 39 for the cathode ray display tube 37, and additionally to synchronize the horizontal sweep generator 130 and vertical sweep generator 129 for the flying spot scanning tube 31 therewith. Synchronization signals are also coupled to the speed sawtooth generator 114. It is apparent that in operation, the chassis 39 effects provision of a raster on the screen of cathode ray tube 37, and in such trace the information which is sensed by the photomultiplier tubes of camera 19 is coupled to the grid of the cathode ray tube 37 for reproduction thereon.

In the foregoing description, the transformation of speed and altitude was considered in terms of zero pitch and azimuth angles. As shown hereinafter, the horizontal line and each cardinal point are unique and identifiable, and as a result, with the movement of the pitch and azimuth from the zero values, the horizontal line or the cardinal point is moved away from the center of the transformation. Compensating signals are therefore introduced to prevent the appearance of cyclic motion of these identifiable points, and more specifically are introduced to provide a cyclic motion to the center of the readout raster. Such motion is derived from the speed sawtooth waveform generator 114, the output thereof being coupled over an azimuth conversion unit 134 which is coupled to the speed sawtooth generator 114, the horizontal sweep generator 130 and the horizontal deflection coil 131 for the flying spot scanner tube 31. In a similar manner, a compensating signal is coupled from the output circuit of the speed sawtooth generator 114 to a pitch conversion unit 137, which is coupled to the sawtooth generator 114, the vertical sweep generator 129, and the vertical deflection coil 132 for the flying spot scanner tube 31. The compensating signals coupled to the horizontal and vertical coils thus maintain proper positioning for the horizon and cardinal points as a variation in pitch or azimuth occurs, the specific circuitry for effecting such manner of operation being now set forth in detail.

Speed Indication Generation Circuitry

It will be initially recalled with reference to FIGURE 7, that a representation of speed is effected by periodically compressing the size of the scanning raster of the flying spot scanner at a uniform rate and then expanding the source nearly instantaneously, so that the resulting grid picture on the display tube appears to move continuously across the screen to simulate forward motion. The rate of expansion is varied with the speed of the aircraft so that the visual indication speed is representative of the actual speed of the aircraft, the raster being incrementally compressed to advance the lines by successive increments, and being instantaneously expanded as soon as one horizontal line reaches the position initially occupied by the succeeding horizontal line in the pattern. Application of such signal in a cyclic manner results in the provision of a display wherein a succession of horizontal lines appears to emanate continuously from the horizon and to pass across the screen to the lower edge thereof. It is noted that progressive compression of the raster of the flying spot scanner results in apparent advancement of a line on the display screen in that the successively smaller rasters readout a corresponding smaller area on the sphere, and the resultant reproduction of the successively smaller areas on the display screen (which is of a fixed dimension) results in the advancement of the lines by a corresponding increment. Reference is made to FIGURES 1L–1P as an illustration of the manner in which the lines advance across the display, one line being shown in a thicker dimension to more clearly illustrate the extent of such movement as successive degrees of compression are accomplished.

As shown in FIGURE 7, such movement is achieved by coupling a signal representative of the air speed input over a speed conversion unit 111, an associated potentiometer 112 and a speed sawtooth generator 114 which provides sawtooth output signals which are proportional in duration to the speed of the aircraft. Such signals are in turn coupled to a power supply high voltage modulator 116 which adjusts the value of the high voltage signal applied to the anode of the flying spot scanner between 8–12 kv. over a time period which varies with the duration of the input sawtooth signal (i.e., the speed of the aircraft). With the application of the initial slope of the sawtooth wave (a relatively small potential) by sawtooth generator 114, the raster of the flying spot scanner tube 31 is increased to its largest size. As the sawtooth input signal increases in value, the signal coupled to the anode of the flying spot scanner tube 31 also increases, and the flying spot scanner raster becomes progressively smaller. As the raster decreases in size, the resultant display on the screen expands by a corresponding value, and the lines appear to advance a corresponding increment across the screen. As the applied signal increases progressively from 8 to 12 kv. a line emanating from the horizon will have moved across the screen to the position of the line which was next adjacent thereto in the initial display of the cycle.

In this regard it is noted that in one embodiment, the grid lines on the sphere are marked so that if the spacing of the first line from the horizon is $y$, the spacing from the second line is $ky$ when K (the expansion factor) is 1.5. In like manner the distance from the horizon line to the third line is $K^2y$, to the fourth line is $K^3y$, etc. In one actual embodiment, the actual values were:

$y = 0.085$ in.
$k = 1.1414$
$r = 4.875$ in. (the radius of the sphere).

Figure 9:
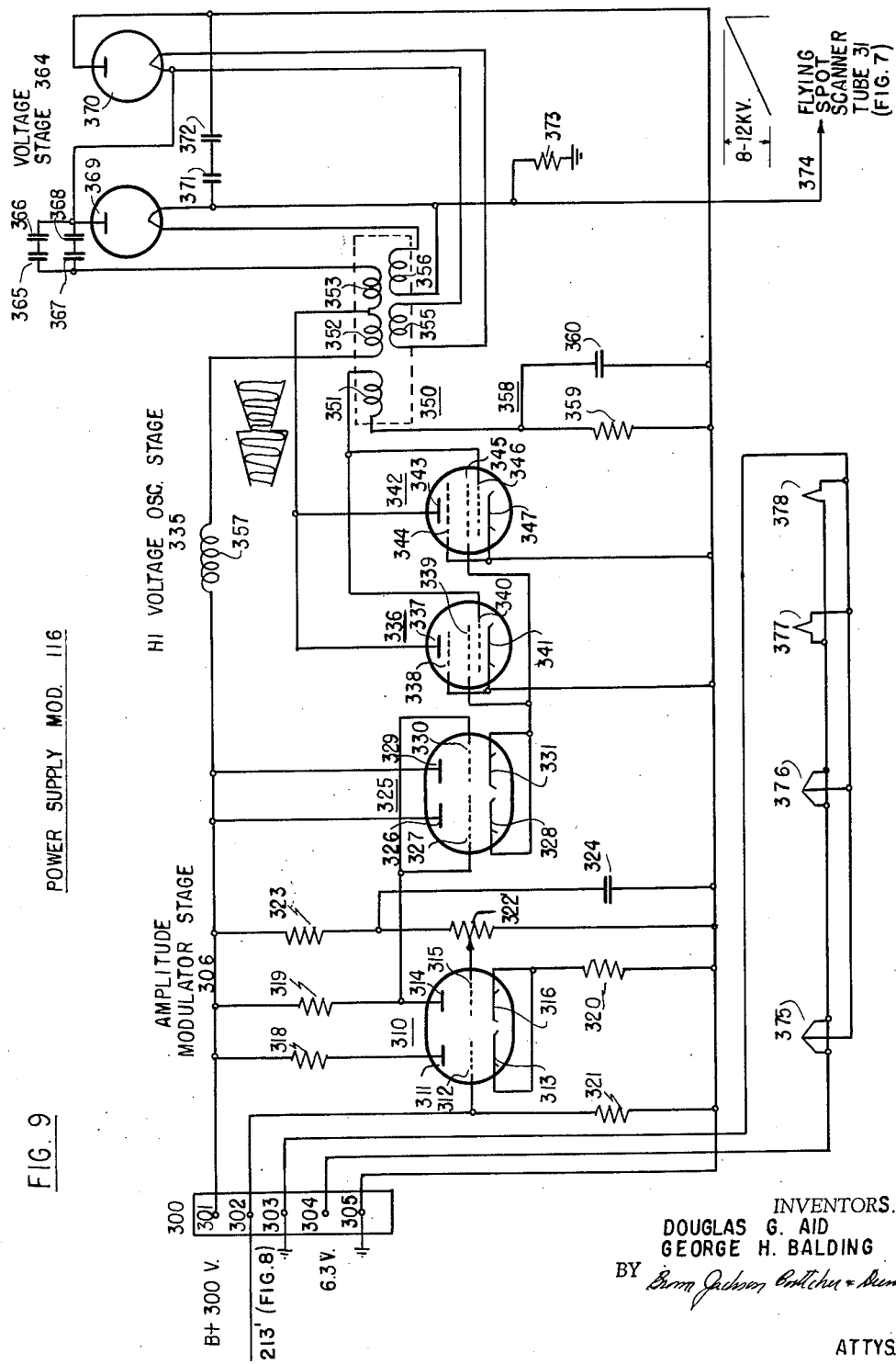

With reference to FIGURES 8 and 9, one set of circuitry for effecting the moving speed display is set forth thereat. As there shown, the speed conversion unit 111 is connected to the aircraft air speed indicator 110 to generate a potential signal which is indicative of the air speed signal derived from the airspeed indicator of the aircraft. Such equipment may comprise a synchro control transmitter of the type, for example, which is commercially available as a Kearfott Model No. R-512 which operates at 115 volts 400 cycles per second. The output of the synchro control transmitter is in turn connected to a synchro control transformer such as, for example, Kearfott Model No. R–502 which couples the signal to an amplifier such as, for example, Kearfott Model T–3100 which in turn serves to operate a motor generator such as, for example, Kearfott Model No. R–309. The motor generator drive shaft of the servo mechanism unit is connected through gearing to drive a potentiometer 112 which may be biassed by a constant reference voltage to effect a stable signal output as shown hereinafter. The signal output of the potentiometer 112 is coupled to the input terminal 203 for the speed sawtooth generator 114.

Speed Sawtooth Generator 114

The speed sawtooth generator 114 (FIGURE 8) basically comprises a terminal block 200 having input and output terminals 201–216 for coupling the stages thereof to the potentiometer 112 and the power supply modulator 116; a timing stage 220, a vertical sync mixer stage 229, a flyback control univibrator stage 250, and a constant current changing stage 270.

The timing stage 220 which is connected to the input terminal 203 basically comprises charging resistor 221, potentiometer 112 and resistor 271, capacitor 222, discharge resistor 227, and voltage divider circuit 223 including resistors 224–226, resistors 224 and 226 being connected in parallel with one another and in series with resistor 225 between negative bias potential on terminal 205 and ground. An adjustable arm is connected between resistance 226 and capacitor 222.

It is noted that in the interest of simplifying the following disclosure, the terminals which extend to a power supply such as terminal 205, are marked with the value of the potential which is coupled thereover, so that the individual connections extending to the power source and the power source per se may be omitted.

The input signal circuit for the speed sawtooth generator 114 (terminal 203) is also coupled to the vertical sync mixer stage 229 which may comprise a twin triode vacuum tube 230, of the type commercially available as a 5963, having anodes 231, 234, grids 232, 235, cathodes 233, 236, and filaments 267, respectively. Anode 231 of the first section is connected over terminal 201 to 300 volts B+ source; grid 232 is coupled over resistor 221 to the input terminal 203 and also to capacitor 222; and is coupled over resistor 249 to the grid of the second section of tube 230. Cathode 233 is coupled over voltage divider 240 to ground, the voltage divider 240 being comprised of resistors 238, 239, 240, 241 with an adjustable tap on resistor 239 being connected to derive an output signal therefrom for coupling to the air speed indicator terminal 213 and the power supply modulator 116 (FIGURE 9) which is connected thereto. Filter capacitor 242 is connected across the voltage divider circuit 240 and ground.

The plate 234 of the second section of the vertical sync mixer stage 229 is coupled with anode 231 over terminal 201 to the 300 volt B+ source; grid 235 is controlled by vertical sync input signals which are coupled thereto over terminal 209 and capacitor 244 by the sync generator 140 (FIG. 7); and the cathode 236 is coupled over resistor 243 to ground, and also over resistor 245 to the input circuit for the flyback control univibrator stage 250; and additionally over conductor 270' to the constant current charging circuit 270.

The flyback control univibrator 250 may comprise a twin section triode vacuum tube 251, of the type commercially available as a 5963, including anodes 252, 255, control grids 253, 256 and cathodes 254, 257. A control relay 265 is connected in the plate circuit for the first section of tube 251 to the B+ source on terminal 201, capacitor 264 being connected in parallel with the control relay 265. Control grid 253 of the first section is coupled over grid resistors 245, 246 to the cathode circuit of the second section of vertical sync mixer 230, and is capacitively coupled over capacitor 258 to the plate 255 of the second section of tube 251. Cathodes 254, 257 are coupled over common resistor 259 to ground. The anode 255 of the second section of tube 255 is coupled over resistor 263 to the 300 volt B+ source, and control grid 256 is coupled to the plate circuit of the first section of tube 251 by resistor 261, and also over resistor 260 to ground.

The constant current charging circuit may comprise a neon light 272 and capacitor 273 parallel-connected between the input terminal 202, and conductor 270' which is coupled to the cathode circuit of the second section of the vertical sync mixer tube 230. The constant current charging circuit 270 provides a constant charging current to the input circuit for the timing stage 220, the circuit being connected to follow the rising wave fronts which appear in the cathode circuit of tube 230 and to provide a potential across potentiometer 112 which is sixty volts greater in value than the output signal of the cathode circuit of the vertical sync mixer tube 230.

The following chart sets forth representative values of the component parts in one particular operative embodiment:

SPEED SAWTOOTH GENERATOR COMPONENTS

| | |
|---|---|
| R241 | 5K ½ w. |
| P274 | 250K ½ w. |
| R240' | 100K ½ w. |
| P226 | 10K. |
| P224 | 10K ½ w. |
| P225 | 10K 1 w. |
| P237 | 10K 2 w. |
| P260 | 150K ½ w. |
| P259 | 10K 2 w. |
| P246 | 68K ½ w. |
| R243 | 10K 2 w. |
| P239 | 10K 2 w. |
| P245 | 56K ½ w. |
| P227 | 100 ½ w. |
| Relay PW5L | 10K. |
| P261 | 220K ½ w. |
| P249 | 100K ½ w. |
| P221 | 56K ½ w. |
| P238 | 15K 1 w. |
| P263 | 10K 2 w. |
| R271 | 100K ½ w. |
| C264 | .02 400 v. |
| C242 | 0.1 200 v. |
| C222 | 4 200 v. |
| C258 | 270 400 v. |
| C244 | .0001 400 v. |
| C262 | 0.1 400 v. |
| C273 | .001 200 v. |

In operation, as the control signal output of potentiometer 112 which is indicative of the aircraft speed, is applied to the input terminals 202, 203 of the speed sawtooth generator 114, a charging circuit is established over capacitor 222 which extends from 300 volts B+ over resistor 271, terminal 202, potentiometer 112, resistor 221, capacitor 222, and voltage divider 223 to ground, and a rising wavefront is applied to the control grids 232, 235 of the first and second sections of the vertical sync mixer tube 230. As the potential rises, the first and second sections of tube 230 become more and more conductive, and a rising potential waveform appears in the cathode circuits thereof. The rising potential signal which appears in the cathode circuit of the first section is applied over the voltage divider circuit 240 and the output terminal 213 to the input of the power supply modulator 116 (FIG. 9) to control the rate of contraction of the raster on the flying spot scanner tube 31 as more fully described hereinafter.

The rising potential in the second stage is coupled to the constant current charging circuit 270, the conducting neon tube 272 being operative to follow the rising wave front and to provide a proportionately increasing voltage to resistor 271 and potentiometer 112, whereby the potential drop across potentiometer 112 is maintained at approximately 60 volts during the flow of current in the charging circuit, and a constant value current is maintained in the charging circuit.

During such period the vertical sync output pulses of the sync generator 140 for the system are coupled over terminal 209 and capacitor 244 to grid 235 for the vertical sync mixer stage 229, and such pulses modulate the rising sawtooth wave in the cathode circuit of the second section of tube 230, the output waveform being modulated by the sync pulses as shown in the schematic illustration adjacent such circuit in FIGURE 8.

As the rising potential approaches the value required to bias the first section of tube 251 to conductivity, the vertical sync pulse mixed with the sawtooth wave effects such conductivity, and the first section of univibrator tube 251 is rendered conductive to operate relay 265 which is connected in the plate circuit thereof. The provision of vertical sync pulses in this manner ties the trailing edge of the sawtooth wave output of the speed sawtooth generator 114 to the vertical frame retrace of the flying spot scanner tube 37.

As relay 265 operates, it is effective at its contacts 266 to complete a discharge circuit for capacitor 222 which extends over resistor 227 and contacts 226 to the voltage divider network 223 and ground.

During the period of conductivity of the first section of tube 251 in the flyback control univibrator stage 250, the potential drop which appears in the plate circuit thereof is coupled over resistance 261 to grid 256 of the second section to bias same to cutoff, and the resultant rising potential which appears in the circuit of anode 255 thereof is coupled over output terminal 207 to the sync generator 150 for the system to blank the display tube 37 for one frame and thereby provide a "reset" period for the speed indication generating circuitry.

More specifically, during the frame blank period and operation of the relay 265, capacitor 222 discharges, and the first and second sections of vertical sync mixer tube 229 are cut off sharply, and a vertical trailing edge is provided for the output sawtooth wave in the cathode circuit of the second section of tube 230. As the trailing edge is coupled over the air speed output terminal 213 to the power modulation circuit 116 and also to the flyback control univibrator stage 250, the first section of the univibrator tube 251 is responsively biased to cutoff, and relay 265 restores to interrupt the discharge circuit for capacitor 222. As the voltage in the first section of the univibrator tube 251 rises, the resistor coupled second section of tube 251 is rendered conductive, and the blocking signal which was being extended over terminal 207 to the sync generator equipment 140 is terminated. As relay 265 restores, the charging circuit for capacitor 222 is once more reestablished, and the sawtooth generating cycle is reinitiated.

It is apparent that with an airspeed input signal of a smaller value (which is indicative of a relatively slow aircraft speed), the time period required to charge capacitor 222 to a value which results in the operation of relay 265 is of a relatively longer duration, and a sawtooth signal of a correspondingly longer duration is coupled over the output circuit to the power supply modulator 116, and the raster is compressed at a relatively slower rate. As the value of the airspeed signal is increased with an increase in the speed of the aircraft, the time period for charging capacitor 222 is correspondingly reduced, the duration of the sawtooth wave output generator 114 is correspondingly reduced, and the raster is compressed at a relatively faster rate. The speed sawtooth generator 114 thus supplies a sawtooth signal which has a duration which is representative of the aircraft speed.

In certain embodiments, the sawtooth wave output signal which is coupled to the constant current charging circuit may also be coupled over resistor 274 and terminal 214 to the brightness adjusting circuit for the flying spot scanner tube, whereby changes in the brightness of the display which result by reason of changes in the high voltage supply potential coupled to the anode thereof to represent the speed changes will be automatically offset by a corresponding adjustment of the brightness circuit in a compensating manner.

*Power Supply Modulator 116*

As shown in the schematic illustration of FIGURE 7, the output signal of the speed sawtooth generator 114 consisting of a sawtooth wave having a duration related to the aircraft speed is coupled to the input circuit of the power supply modulator circuit 116, and as noted heretofore, modulator circuit 116 is operative to adjust the high voltage output signal to the anode of the flying spot scanner tube 31 between 8–12 kv., the time period of variation between such values being related to the aircraft speed. With the coupling of such signal to the flying spot scanner tube 31 an incremental contraction of the raster output thereof is effected over a period which is consistent with the duration of the sawtooth signal, the raster is then instantaneously expanded to its initial size as the vertical edge of the sawtooth wave is coupled to the anode of the scanner tube 31.

With reference to FIGURE 9, the power supply modulator unit 116 may comprise a terminal block 300 for connecting the unit 116 to the sawtooth generator 114, the scanner tube 31, and to the power source (not shown); an amplitude modulator stage 306, a high voltage oscillator stage 335, and a voltage doubler stage 364. The amplitude modulator stage 306 which is coupled over input terminal 302 and conductor 213 to the speed sawtooth generator 114 may comprise a first and a second twin triode vacuum tube of a type commercially available as a 12AX7, each of which may comprise anodes 311, 314; 326, 329; control grids 312, 315; 327, 330; and cathodes 313, 316; 328, 331, respectively.

The plates 311, 314 of the first and second sections of tube 310 are connected over load resistors 318, 319 and terminal 301 to the 300 volt B+ supply source; control grid 312 of the first section of tube 310 is coupled to the input terminal 302 (which is in turn coupled to the output side of the speed sawtooth generator 114), and the cathodes 313, 316, respectively are coupled over cathode resistor 320 and terminal 305 to chassis ground. Grid resistor 321 is connected between control grid 312 of the first section of tube 310 and ground.

Control grid 315 of the second section of tube 310 is coupled over variable resistor 322 of the voltage divider including resistors 322, 323 to the output circuit for the first and second sections of tube 310 in the conventional manner of a resistance-coupled amplifier. Blocking capacitor 324 is connected between resistors 323 and 322 to ground.

The output circuit of the second stage 310 is coupled to the control grids 327, 330 of the second tube 325 in the amplitude modulator stage, which may be of the type commercially available as a 12AU7. Both sections of tube 325 are connected as cathode followers, the plates 326, 329 respectively being connected over terminal 301 to the B+ supply source, and cathodes 328, 331 respectively being connected to the input circuit for a pair of tubes 336, 342 which are connected as oscillators in a high voltage oscillator stage 335. Control tube 325 effectively matches the impedance of amplifier tube 310 to the oscillator tubes 336, 342.

Oscillator tubes 336, 342 may comprise a pair of pentode tubes, each of which is commercially available as a 5763, and which comprise a plate 337, 343; a screen grid 339, 345; a control grid 340, 346; a suppressor grid 338, 344; and a cathode 341, 347, respectively. The screen grids 339, 345 are coupled to the cathodes of tube 325;

suppressor grids 328, 344 are coupled to the cathodes 341, 347, respectively; the plates 337, 343 are coupled over the first primary winding 352 of transformer 350 and RF choke 357 to terminal 301 and the B+ supply source. The control grids 340, 346 are coupled over secondary winding 351 of transformer 350 and the oscillator tank circuit 358 including resistor 359 and capacitor 360 to ground.

The output signals of the oscillator stage are coupled over the secondary windings 355, 356 of transformer 350 to a voltage doubler stage 364, which may comprise a pair of high voltage rectifier tubes commercially available as tubes 5642. The anode of rectifier 369 is connected over capacitor network 365–368 and the primary windings 352, 353 of transformer 350 and the RF choke 357 to B+ supply source. The cathode of the first rectifier tube 369 is coupled across the secondary winding 356 of transformer 350, a signal output conductor 374 being connected thereto to couple the signal output of the voltage doubler circuit to the anode of the flying spot scanner tube 31.

The anode of rectifier 370 is coupled to ground signal, and the cathode thereof is coupled to the secondary winding 355 of transformer 350. Filaments 375–378 for tubes 310, 325, 336, 342 respectively are connected over terminal 304 to 6.3 volt energizing potential. The following chart sets forth the values of components in one operative embodiment of the device.

| | |
|---|---|
| L356. | |
| R321 | 1 meg. 2 w. |
| R318 | 330K 2 w. |
| R373 | 120 meg. 5 w. |
| R359 | 33K 2 w. |
| R320 | 50K 2 w. |
| R322 | 1 meg. 2 w. |
| R323 | 1 meg. 2 w. |
| R318 | 330K 2 w. |
| C368 | 500 mmf. 6 kv. |
| C367 | 500 mmf. 6 kv. |
| C366 | 500 mmf. 6 kv. |
| C365 | 500 mmf. 6 kv. |
| C372 | 470 mmf. 6 kv. |
| C371 | 470 mmf. 6 kv. |
| C360 | 600 v. 0.01 mf. |
| C324 | 0.02 mf. |

In operation, as the input sawtooth signal having a duration which is indicative of the airspeed of the aircraft is applied to the input terminal 302 by speed sawtooth generator 114, and then to the control grid 312 of the first section of amplifier tube 310, the amplified output which appears in the anode circuit thereof also appears across the voltage divider circuit 322 and is applied to the control grid 315 of the second section in the manner of a resistance coupled amplifier. The output signal which appears in the anode circuit of the second section of tube 310 is coupled to the control grids 327, 330 of the second tube 325 of amplitude modulator stage 306, which as noted heretofore is connected as a cathode follower to effect increased power amplification of the signal input thereto, and to provide an impedance matching arrangement between the amplitude modulator stage 306 and the high voltage oscillator stage 335.

With the application of a control signal to the screen grids 339, 345 which is sufficient to bias the tubes 336, 342 to conduct, oscillator stage 335 is operative in the manner of a conventional tickler coil oscillator, the amplitude output of the oscillations being increased incrementally with the application of the rising wavefront of the sawtooth wave to the screen grids 339, 345. Briefly, as the tubes 336, 342 begin to conduct an increasing current flow occurs in the anode circuits thereof, and across the primary winding 352 of transformer 350. The increasing current flow in the primary winding 352 effects induction of a voltage signal into the secondary winding 351 which is coupled to the control grids 340, 345 and the tank circuit 358. Capacitor 360 charges negative to increase the negative bias on control grids 340, 346, and thereby the conductivity of tubes 336, 342. As the tube conductivity increases, the current conductivity in the primary windings 352 of transformer 350 increases and the positive going signal to the control grids also increases to thereby further increase the conductivity of the tubes 336, 342.

As the maximum current conductivity of the tubes 336, 342 is reached, a constant value current flows therethrough. As the rate of change of current in the secondary winding 351 is thus terminated, the positive signal on control grids 340, 345 decreases. As the decrease in the conductivity occurs, the collapsing magnetic field in the secondary winding 352 of transformer 350 induces a negative-going signal in winding 351 which is coupled to grids 340, 346 to bias tubes 336, 342 less conductive. A cumulative effect occurs until the tubes 336, 340 are biased to cutoff, capacitor 360 charging to a high negative voltage during such period. As tube conductivity terminates, the magnetic field of winding 352 is interrupted, whereby the oscillating grid voltages become less negative and current flow in the tubes 336, 342 is reinitiated.

Such operation continues, the amplitude of each current oscillation increasing as the value of applied sawtooth signal to screen grids 339, 345 increases to thereby permit an increased current conductivity by the tubes 336, 342 during successive oscillation. As the sawtooth voltage trailing edge is eventually applied to the oscillator stage, the amplitude of oscillation is reduced until such time as a succeeding input sawtooth signal is coupled thereto. The signal output of the stage 335 is shown in the illustration adjacent transformer 350 in FIGURE 9.

The output of the oscillator stage 335 is coupled over transformer winding 352, 353 to the secondary windings 355, 356 of transformer 350 and the voltage doubler stage 364.

The voltage doubler circuit operates in a conventional manner to deliver a D.C. voltage output which is equal to the peak to peak voltage of the alternating current signal which appears in the transformer winding 353, and in the present arrangement provides a high voltage sawtooth signal which varies in amplitude between 8–12 kv. Briefly, the high voltage signal from transformer winding 353 is coupled over capacitors 365, 366, 367, 368 and impressed on the plates of tube 369 and cathode of tube 370. In that the plate of tube 370 is grounded, as each oscillation coupled over capacitors 365, 366 starts to go negative, tube 370 conducts causing capacitors 365, 366 to charge to 50% of the peak to peak voltage. In this way the sine wave never goes negative. This voltage then passes through tube 369 and is rectified, charging capacitors 371, 372 to the peak value. The doubling effect is accomplished by tube 370 conducting when the capacitor 365—366, etc., attempts to go negative. In the present embodiment the output voltage as coupled over resistor 373 and conductor 374 to the anode of the flying spot scanner is in the order of 8–12 kv.

With the application of a sawtooth signal of 8–12 kv. to the anode of the flying spot scanner, the raster of the scanner tube is decreased from a first given size in successive increments to a second given size, the relative size change being indicated in FIGURES 1L–1P. With the incremental reduction in the size of the raster, each horizontal line of the initial pattern advances incrementally in the direction of the subsequent horizontal line of the initial pattern at a rate which is determined by the slope (or duration) of the sawtooth wave. In this manner, the illusion of continuous movement of the aircraft over the grid block pattern is effected on the display screen.

*Altitude Indication Generation*

Changes in altitude are represented on the display screen by effectively changing the width and height of the flying spot scanner raster to correspondingly different values. With reference to FIGURES 1a–1e; 1l–1p there is set forth thereat in schematic form a set of readout rasters of various areas, and to the right thereof in FIGURES 1A–1E; 1L–1P the corresponding set of display patterns which will be presented on the display screen. The manner in which such display results is believed to be obvious from the representations thereat and the earlier description herein.

The rasters are adjusted to the different shapes to provide the different type displays set forth thereat as shown in FIGURE 7 by coupling a signal from the aircraft altimeter 125 to an altitude conversion unit 126 which may comprise a set of commercially available Kearfott equipment which may comprise a synchro control transmitter. Model No. R–512 which operates at 115 volts, 400 cycles per second the output of which is in turn connected to a synchro control transformer; Model No. R–502 which couples the signal to an amplifier such as, for example, Kearfott Model T–3100 which in turn serves to operate a motor generator such as, for example, Kearfott Model No. R309. A motor generator drive output shaft of altitude conversion unit 126 is connected to drive a horizontal potentiometer 128 and a vertical potentiometer 127. The altitude conversion unit 126 provides signals indicative of the altitude of the aircraft to the potentiometers 128 and 127 which are biased by a constant reference voltage from a power supply 97. Changes effected by moving the horizontal and vertical potentiometers 128 and 127 respectively are thus referenced to a common and constant value. The outputs of the potentiometers 127 and 128 are fed to the vertical and horizontal sweep generator 129, 130 for the flying spot scanner tube to vary the signal output thereof to vertical coils 132 and horizontal coils 131 respectively in the adjustment of the height of the raster trace and the width of the raster trace.

Figure 10:
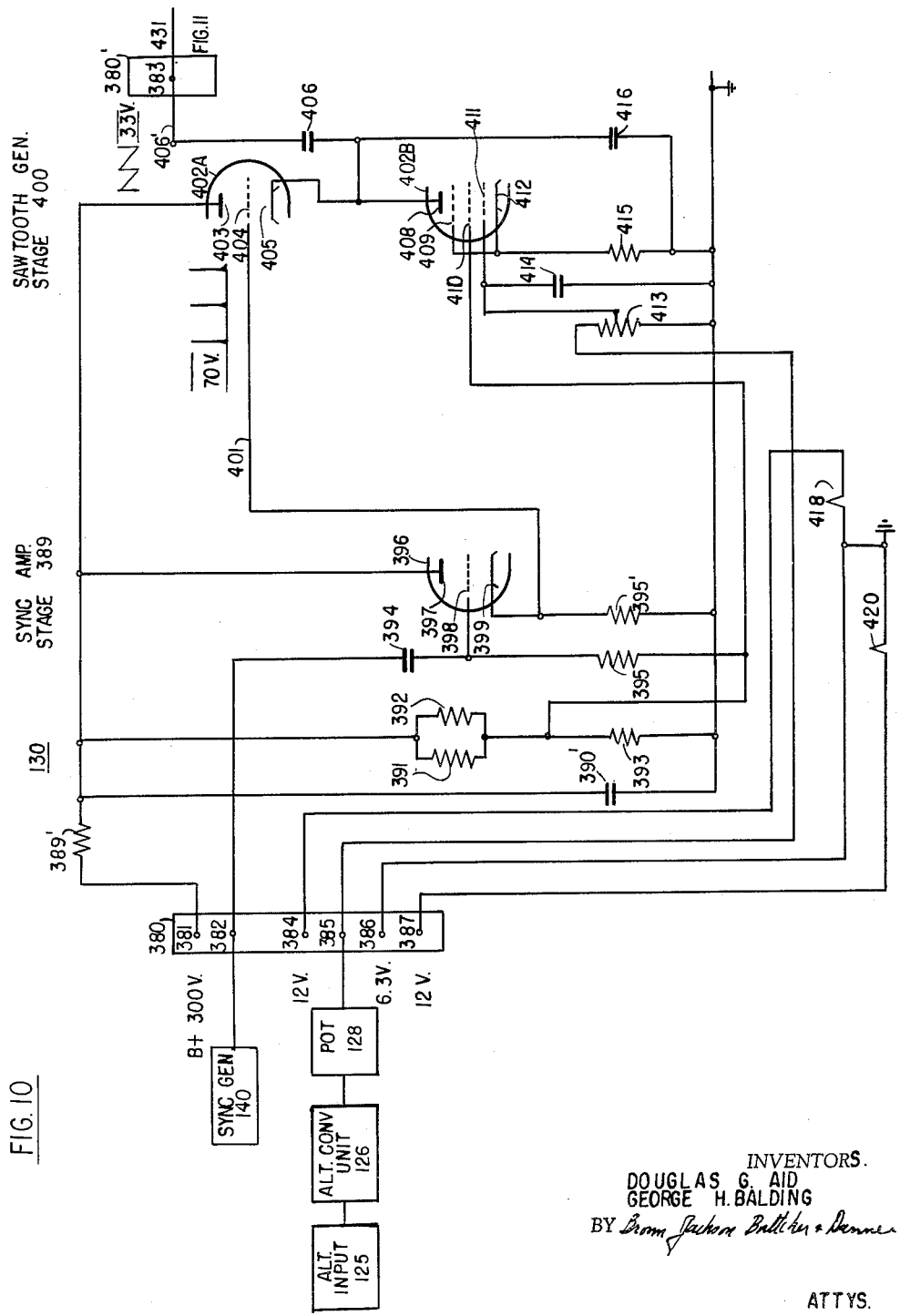
Figure 11:
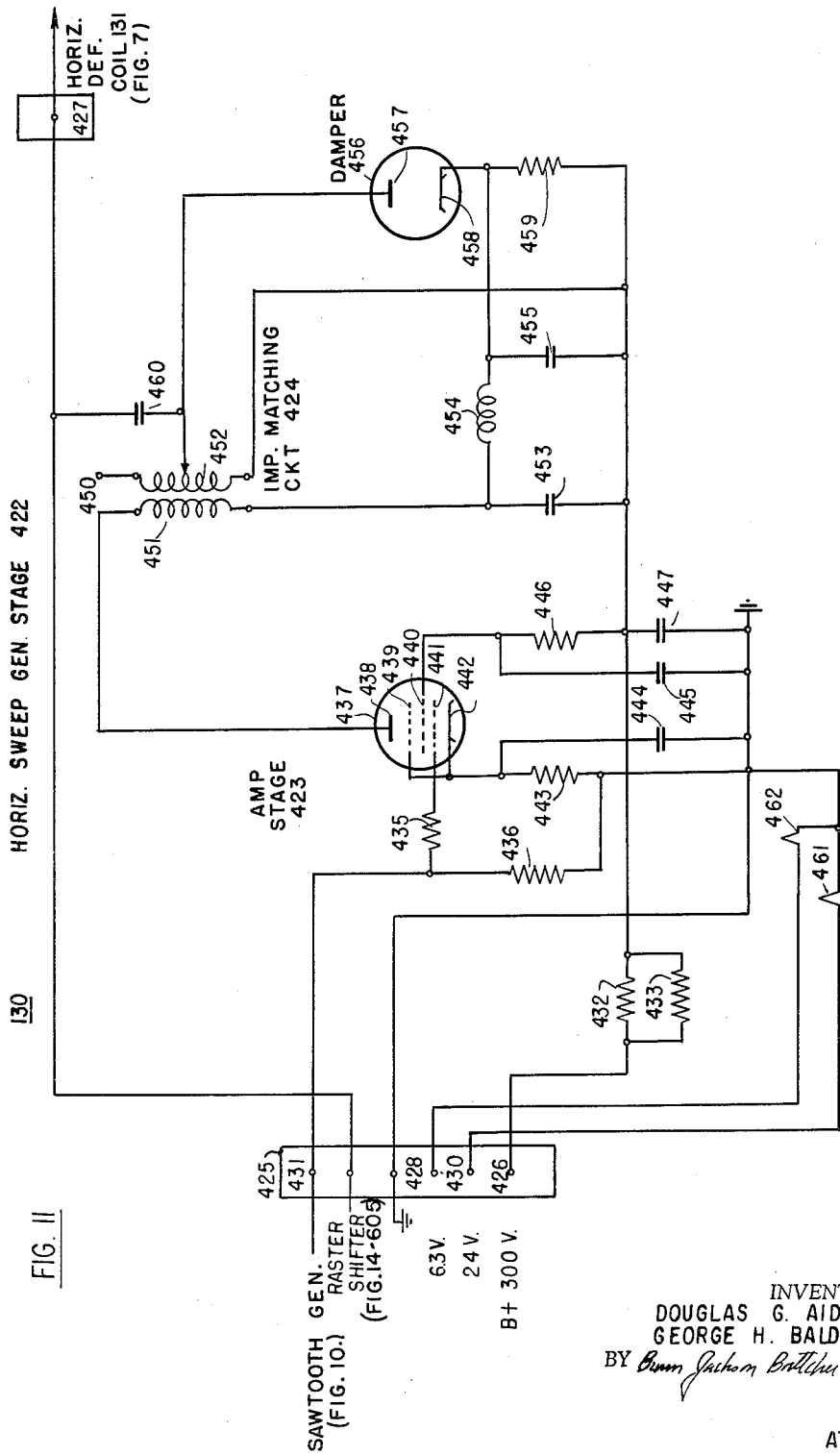

With reference to FIGURES 10 and 11, the horizontal sawtooth generator 130 is shown in detail thereat. As there shown, the generator 130 may comprise an input terminal block 380 including terminals 381–387 over which power supply voltages and the control signals are coupled thereto. The generator 130 may comprise a sync amplifier stage 389, a sawtooth generator stage 400, terminal blocks 380', 425 (FIG. 11) and a horizontal sweep generator stage 422. More specifically, the sync amplifier 389 may comprise a triode vacuum tube 396 of the type commercially available as a 5963, connected as a cathode follower to provide an impedance match for the output signals of the altitude potentiometer 128 to the sawtooth generator stage 400. As shown, the triode 396 may comprise an anode 397, a control grid 398 and a cathode 399. The plate 397 is connected over load resistance 389' and terminal 381 to the 300 volt B+ supply source; control grid 398 is coupled over capacitor 394 and terminal 382 to the output of sync generator 140, the control grid 398 being also connected over resistor 395 and voltage divider circuit 391, 392, 393 to ground. Filter capacitor 390' is connected from the plate circuit to battery to isolate the B+ supply source from the horizontal pulses. Cathode 399 is connected over resistance 395' to ground and the signal potential output of the cathode circuit is coupled over conductor 401 to the input circuit of the sawtooth generator stage 400.

The sawtooth generator stage 400 may comprise one section of a twin section vacuum triode tube 402A commercially available as a 6U8 including plate 403, control grid 404 and cathode 405. Anode 403 is connected over resistor 389' and terminal 381 to 300 volt B+ supply voltage; control grid 404 is coupled over conductor 401 to the cathode circuit of the sync amplifier stage 389; and cathode 405 is connected to the anode circuit of a second section 402B of the 6U8 vacuum tube.

The second section 402B may include a plate 408, a suppressor grid 409, a screen grid 410, a control grid 411 and a cathode 412. The anode 408 of the tube section 402B is coupled to the cathode 405 of the first section 402A and intermediate the coupling capacitors 406, 416. Suppressor grid 409 is coupled internally to cathode 412; screen grid 410 is coupled to voltage divider including resistances 391, 392, 393, control grid 411 is coupled over adjustable resistance 413 and terminal 385 to the output of the altitude indicating potentiometer 123 and is coupled over capacitor 414 to ground. Cathode 412 is coupled over resistor 415 to the second plate of capacitor 416 and to ground. It is apparent therefore that the second section 402B of tube 402 is connected across the power source supply conductors in parallel with capacitor 416. Capacitor 406 is connected in the output circuit for the sawtooth generator which extends over terminal 383 to the sweep circuit for the horizontal coil 131 of the flying spot scanner tube 31. Filaments 418, 420 are energized over terminals 384, 387, 12 volts and 6.3 potentials respectively.

The following chart sets forth representative values of the components of one embodiment of the invention:

HORIZONTAL SAWTOOTH GENERATOR COMPONENTS

| | |
|---|---|
| R415 | 3.3K ½ w. |
| Pot 413 | 1 Meg. |
| R315' | 22K 2 w. |
| R395 | 470K ½ w. |
| R393 | 10K 2 w. |
| R392 | 68K 2 w. |
| R391 | 68K 2 w. |
| R389' | 2.2K 2 w. |
| C414 | 0.1 µf. 100 v. |
| C416 | .0005 µf. 400 v. |
| C390 | 8.0 µf. 450 v. |
| C394 | .0047 µf. 200 v. |
| C406 | .0047 µf. 400 v. |

In operation, the output signals of the sync generator 140 (FIGURE 7) at the conventional rate of 13,125 cycles per second are coupled over terminal 382 and capacitor 394 to the control grid 398 of tube 396 in the sync amplifier stage 389. Tube 396 operates to amplify the input signals in the conventional manner, and to extend a corresponding set of signals over conductor 401 to the sawtooth generator stage 400, the nature of the pulses being shown in the block representation which appears adjacent conductor 401 in FIGURE 10.

As each amplified signal is coupled to the control grid 404 of the first section 402A of tube 402, the tube section 402A is rendered conductive and a charging path is completed for capacitor 416 which extends from a 300 volt B+ source over terminal 381, resistor 389', section 402A of tube 402, capacitor 416 to ground, and capacitor 416 assumes a charge determined by the value of the power source and the components of the described circuit. As the input pulse to the first section 402A is terminated, the section is rendered non-conductive and the charging of capacitor 416 is terminated.

The second section 402B is maintained conductive to a degree which is determined by the value of the altitude representative input signal derived from the altimeter by the altitude conversion unit 126 and the potentiometer 128, and coupled over terminal 385 and resistor 413 to control grid 411 for the second section 402B. As the upper section of tube 402 is now cut off, capacitor 416 discharges over the path including the second section 402B and resistor 415 to ground.

As capacitor 416 discharges over the circuit including resistor 415 in the second section 402B, a negative going waveform appears across capacitor 406 and the output circuit which extends over terminal 383 to the horizontal sweep generator stage 422. Ostensibly, if a signal of a relatively low negative value is applied to control grid 411 (indicating a high altitude), the tube section 402B will be more conductive and a signal of a relatively large amplitude is coupled to the horizontal sweep generator to increase the raster width. In a similar manner, as a signal of an increased negative value is coupled to control grid 411 indicating a relatively low altitude, the tube section 402B is less conductive and a signal of reduced amplitude is coupled to the horizontal sweep generator stage 422 to decrease the width of the raster. The signal which appears in the output circuit to represent a given altitude is shown schematically in the block located adjacent output conductor 406'. The components of the circuit are adjusted so that each successive incoming sync pulse is coupled to the sawtooth generator stage prior to complete discharge of capacitor 406, tube 402B in effect constituting a constant current discharge path for capacitor 416. Resistors 391, 392, and 393 are divider resistors for developing a specified screen voltage for tube section 402B.

As noted above, the output of sawtooth generator 130 is coupled over terminal 383 to the horizontal sweep output stage 422 (FIGURE 11) in the horizontal sweep generator 130. The horizontal sweep output circuit 422 may comprise a terminal block 425 including terminals 426—431 for coupling the energizing potentials and incoming control signals thereto. A horizontal sweep circuit 422 may basically comprise amplifier stage 423 and impedance matching stage 424. Amplifier stage 423 may comprise an amplifier tube 437, which may be a pentode tube commercially available as a 25BQ6, and which may include plate 438, grids 439, 440, 441 and cathode 442.

Anode 438 is coupled over the primary winding 451 of matching transformer 450, the linearity control coil 454, resistance 459, parallel resistance 432–433 and terminal 426 to the B+ 300 volt supply source; suppressor grid 439 is internally coupled to cathode 442, screen grid 440 is coupled over resistor 446 and resistors 432, 433 to the 300 volt positive potential supply source, capacitor 445 being connected between screen grid 440 and ground, and capacitor 447 being connected in the B+ supply circuit to ground. Control grid 441 is coupled over grid resistors 435 to the input terminal 431 for the horizontal sweep generator stage 422, resistor 436 being coupled between the grid circuit and ground. Cathode 442 is connected over cathode resistor 443 to ground, capacitor 444 being connected in parallel therewith.

A damper tube 456 which may include anode 457 and cathode 458 is coupled with resistor 459 across the secondary winding 452 of transformer 450. The output of the secondary winding 452 of transformer 450 is coupled over capacitor 460 and terminal 427 to the horizontal deflection yoke for the flying spot scanner tube 31.

Capacitors 453, 455 are connected between opposite ends of the linearity coil and the positive potential supply source. Filaments 462, 461 are energized over terminals 428, 430, by 6.3 v. and 24 v. potential respectively.

The horizontal sweep output stage 422 is operative to convert the input sawtooth impulses which may be in the range of approximately 30–50 volts to a current pulse of a sawtooth shape in the order of 400 mils, such practice being conventional in television receiver sets commercially available, and are accordingly only briefly described hereat (see also Glasford—Fundamentals of Television Engineering, 1955).

HORIZONTAL SWEEP OUTPUT

| | |
|---|---|
| Trans. 450 | Triad D14R. |
| R433 | 1K 10 w. |
| R432 | 1K 10 w. |
| R443 | 500Ω 4 w. 10%. |
| R459 | 18K 2 w. 10%. |
| R446 | 3.9K 2 w. 10%. |
| R436 | 2.2M 10%. |
| R435 | 100Ω ½ w. 10%. |
| L454 | 3.6 —30 mh. variable choke. |

HORIZONTAL SWEEP OUTPUT—Continued

| | |
|---|---|
| C460 | 0.22μf. 600 v. |
| C447 | 10μf. 450 v. |
| C455 | 0.15μf. 400 v. |
| C453 | 0.047μf. 600 v. |
| C445 | 0.02μf. 600 v. |
| C444 | 2μf. 150 v. |

In operation, with the application of the sawtooth output of the generator stage 400 over terminal 431 to control grid 441 of amplifier tube 437, tube 437 is rendered conductive, and the tube current flows over a circuit extending from the B+ supply source over terminal 426, parallel resistors 432—433, resistor 459, linearity coil 454, the primary winding 451 of transformer 450, amplifier tube 437, and resistor 443 to ground. The resultant current flow in the primary winding 451 induces a current flow in the secondary winding 452 and over capacitor 460 to the output terminal 427 and the deflection yoke of the flying spot scanner tube. In accordance with conventional practice, damper tube 456 is operative to minimize the oscillating tendencies of the yoke and the transformer secondary. That is, during the fast flyback signal in the output of tube 437, the oscillating voltage thereof is reduced by the conduction of plate 457 of diode 456. As the current flow in the plate circuit of amplifier 437 falls to zero the voltage rises above the supply voltage, and the collapsing field of the inductance attempts to generate in the inductance, a voltage which will maintain the same current flowing in the coil. Plate 457 of diode 456 is drawn positive relative to cathode 458, and tube 456 conducts, whereby the energy in the coil will be dissipated in resistance 459, and any oscillation attempting to raise the voltage at the plate 457 of tube 456, will be quickly dampened.

The sweep generator circuit 422 also effectively increases the available plate supply potential for the driver tube 437 by making use of the D.C. voltage in the cathode circuit of the damper diode 456, the D.C. plate supply potential of the driver being greater than the actual value of the voltage applied from the source over the terminal 426 as the result of the use of the output of the rectifier-filter combination connected to the diode cathode circuit. The value of the voltage boost is dependent upon the amplitude of the output voltage waveform, which is determined in turn by the impedance level of the yoke circuit and the turns ratio of the transformer 450. The linearity coil 454 and capacitors 453, 455 in the diode cathode circuit alter the waveform of the supply voltage for the anode 438 of the driver tube 437, and controls the linearity of current through the deflection yoke during the sweep period.

The resultant waveform output of the circuit in the present embodiment comprises a current pulse of a modified sawtooth wave, as shown, the output circuit pulse being in the order of 500 mils, and therefore of a value to effect corresponding deflection of the flying spot scanner tube beam.

With application of a signal of a relatively large value to the horizontal sweep generator stage 422 the output signal is of a correspondingly increased value. With the application of a signal of a relatively smaller value to the circuit, a pulse of a correspondingly decreased voltage value, but of an increased current value is coupled to the output circuit thereof.

It is apparent from the foregoing description that the width of the raster (or horizontal scan) is determined by the value of the altitude representative signal which is coupled over potentiometer 128 to the horizontal generator circuit 130, signals of a smaller value indicating a lower altitude being operative to provide a raster of a narrow width, and signals of a larger value indicating a higher altitude being operative to provide a raster of a wider dimension.

Vertical Sweep Generation

The height of the raster, as noted earlier, is likewise adjusted to different values in accordance with the value of the output of the signal potentiometer 127 as controlled by the altitude conversion unit 126 and altimeter sensor equipment 125 (FIG. 7).

The vertical sweep generator 129 (FIGURES 12, 13) may comprise a univibrator stage 465, and a vertical sawtooth generator stage 466, which are operative in response to the receipt of the altitude representative signals of various values to provide sawtooth output signals having a potential value which is related to the altitude input signal.

Figure 13:
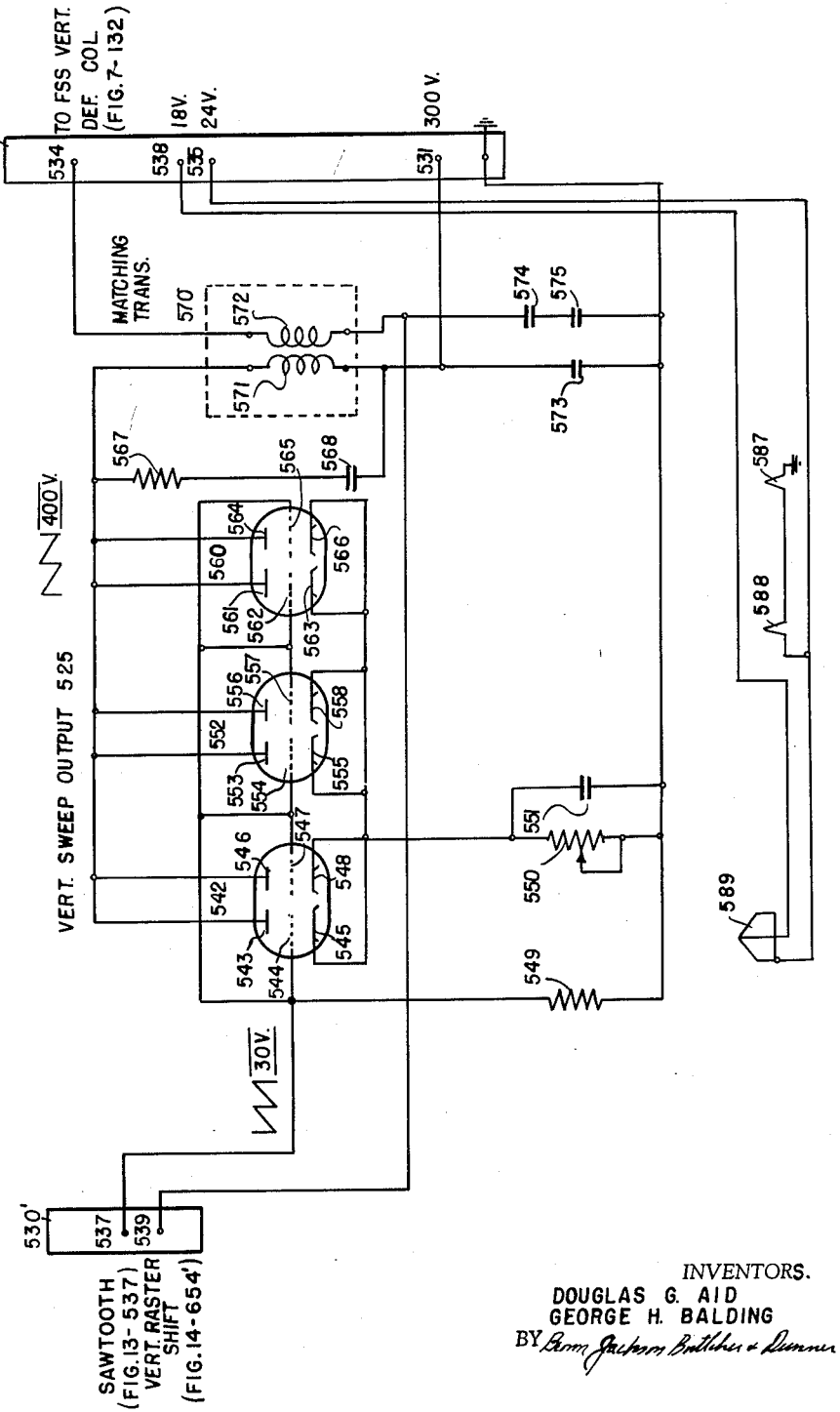

The vertical sweep generator 129 is energized by potentials which are applied over the terminals 471, 475–477, by a power source (not shown), by signals coupled over terminal 474 from the sync generator 140, and by the altitude reference signals which are coupled over terminal 473 by potentiometer 127. The output of the vertical sawtooth generator 466 is coupled over terminal 472 to the associated vertical sweep stage 525 (FIGURE 13).

The univibrator stage 465 of the sweep generator circuit may comprise a twin triode vacuum tube 480 of the type commercially available as a 5963, including anodes 481, 484, control grids 482, 485, and cathodes 483, 486 respectively. Anode 481 is connected over resistors 489 and 487 and terminal 471 to the B+ voltage supply source; capacitor 488 being connected between resistors 487, 489 to ground, control grid 482 is coupled over capacitor 491 and terminal 474 to sync generator 140, grid resistor 492 being connected between the grid circuit and ground. Cathodes 483 and 486 are coupled over resistor 493 to ground.

The anode circuit of the first section of tube 480 is coupled over capacitor 494 to control grid 485 of the second section, grid resistor 495 bein gconnected between the grid circuit and the cathode circuit of the first and second section of tube 480. Anode 484 of the second section of tube 480 is coupled over resistors 490, 487 and terminal 471 to the B+ supply source, and also to the input circuit for the vertical sawtooth generator stage 466. A voltage divider circuit 514 including resistors 514′, 516, 516′ is connected across the power source 300 volt terminals to derive a reference voltage therefrom for supplying screen voltage to tube 500B.

The vertical sawtooth generating stage 466 may comprise a two-section tube including a first section 500a and a second section 500b, which tube is commercially available as a 6U8 type tube. The first section 500a may comprise an anode 501, a control grid 502, a cathode 503, and the second section 500b may comprise a plate 506, grids 507–509 and cathode 510. The anode 501 of the first section 500a is coupled over resistor 487 to the B+ supply source; the control grid 502 is coupled over voltage divider circuit 496, 497 to the output circuit of the univibrator stage 465, and the cathode 503 is coupled over capacitor 513 to ground and also to the anode circuit of the second section 500b.

The anode 506 of the second section 500b is also coupled to capacitors 512 and 513, the output circuit for the sawtooth generator stage 466 extending over the capacitor 512 and terminal 472 to the vertical sweep stage 525. Suppressor grid 507 is coupled internally to cathode 510; screen grid 508 is coupled to the output of the voltage divider circuit 514, and control grid 509 is coupled over adjustable resistor 517 and terminal 473 to the output of the altitude signal generating potentiometer, capacitor 518 being connected between the grid circuit and ground. Cathode 510 is connected over resistor 511 to ground.

Filaments 510, 522 for tubes 500, 480 are energized by 12 volt and 24 volt potential respectively. A set of representative component values for the circuit are set forth in the following chart:

| | |
|---|---|
| Pot. 517 | 1 Meg. |
| R511 | 3.3K ½ w. |
| R516 | 10K 2 w. |
| R493 | 10K 2 w. |
| R492 | 680K ½ w. |
| R497 | 1.5M ½ w. |
| R514 | 68K 2 w. |
| R515 | 68K 2 w. |
| R495 | 680K ½ w. |
| R496 | 1M ½ w. |
| R490 | 82K 2 w. |
| R489 | 82K 2 w. |
| R487 | 2.7K 2 w. |
| C518 | 0.01 µf. 100 v. |
| C513 | 0.1 µf. 400 v. |
| C494 | 500 µµf. 400 v. |
| C491 | .001 µf. 200 v. |
| C512 | 0.1 µf. 400 v. |
| C488 | 8 µf. 450 v. |

Figure 12:
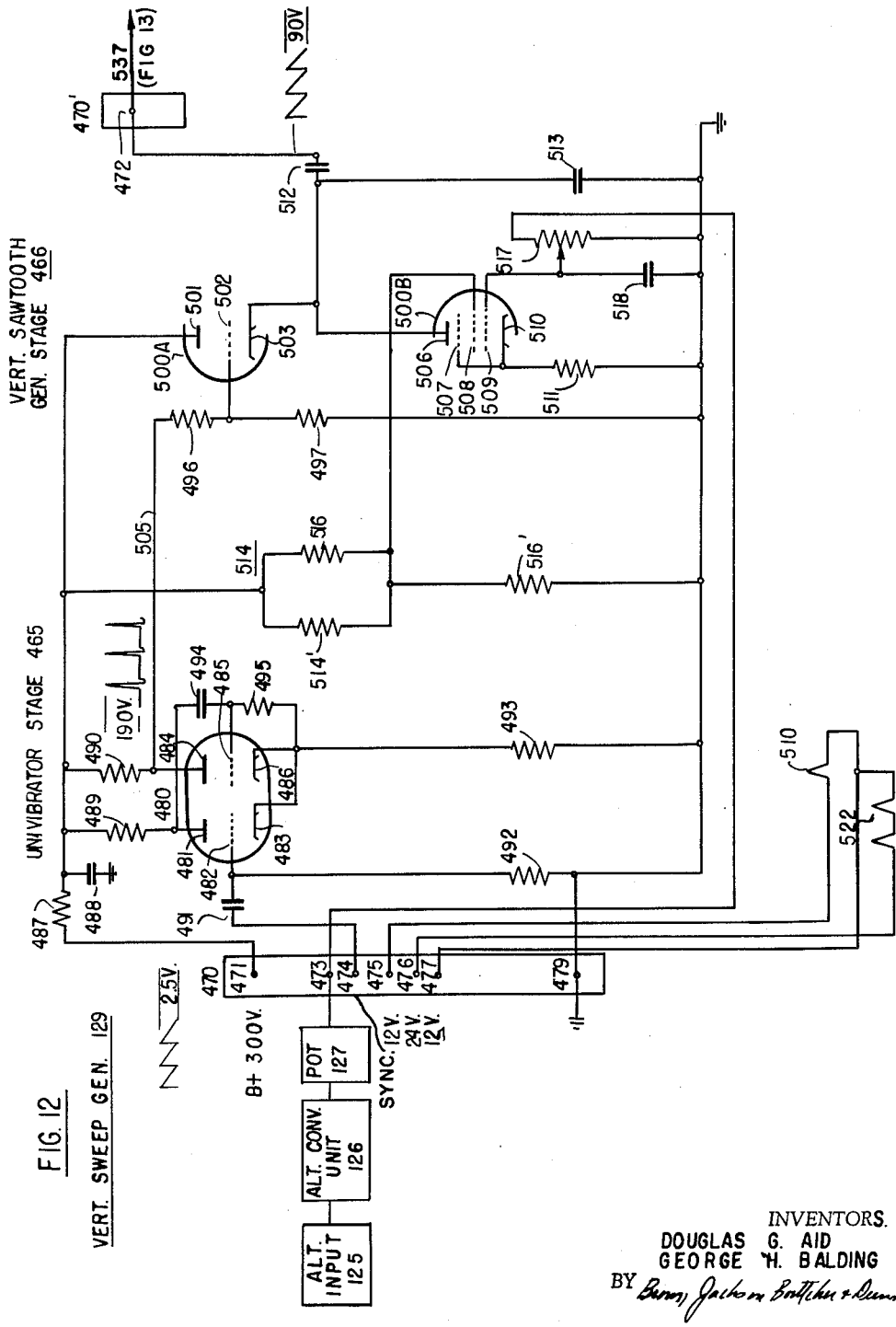

In operation, the sync generator 140 transmits vertical sync signals over terminal 474 at the conventional rate of 50 cycles per second to initiate a raster trace each 1/50 of a second. The incoming signals as received over terminal 474 are coupled over capacitor 491 to the control grid 482 of the first section of tube 480 in the univibrator stage 465, which section is rendered conductive to effect the application of a corresponding signal over capacitor 494 to the control grid 485 of the second stage of tube 480 which is rendered conductive in a similar manner. The components of the amplifier circuit are selected to provide an increased pulse amplitude, and in the particular embodiment of the present disclosure, are operative to increase the pulse amplitude from 25 to 190 volts. The pulse input and pulse output of the univibrator stage 465 is schematically shown in FIGURE 12.

The output pulses are coupled over conductor 505 and voltage divider 496, 497 to the control grid 502 of the first section 500a of tube 500.

As each positive going pulse output operation is applied to the control grid 502 of the first section 500a, the first section is rendered conductive to complete a charging circuit for capacitor 513, such circuit extending from 300 volt B+ supply source over resistor 487, the first section 500A of tube 500, and capacitor 513 to ground. As the pulse on control grid 502 is terminated the tube becomes nonconductive and the charging circuit for capacitor 513 is terminated. As conduction by tube section 500A is interrupted, tube 500B begins to conduct at a rate which is determined by the value of the altitude representative bias voltage which is coupled over adjustable resistor 517 to the control grid 509. It is apparent that if a signal of a relatively small negative value representing a low altitude is applied to control grid 509 a relatively increased conductivity of tube section 500B is effected, and as a signal of a larger negative value is applied thereto, a relative decrease in conductivity results.

During the period of conductivity of tube section 500B and nonconductivity of tube section 500A, capacitor 513 discharges over the circuit including tube section 500B and resistor 511 at a rate which is determined by the degree of conductivity of tube section 500B. The resultant negative going wave shape is coupled over capacitor 512 and the output terminal 472 to the vertical sweep circuit 525. The nature of the output pulses is shown in the schematic block representation in FIGURE 12 adjacent capacitor 512 and the output conductor to the vertical sweep circuit. It is apparent therefrom that the potential value of the sawtooth wave output by the sawtooth generator stage 466 will vary with the value of the altitude representative signal which is applied to the vertical generator stage 129 by the altitude sensing equipment, a signal of decreased negative amplitude being applied over the potentiometer 127 for low altitudes whereby the tube section 500B is more conductive to effect a fast capacitor discharge and thereby provide an output signal of increased amplitude to the vertical sweep stage 525. In the event of a relatively high altitude, the signals coupled to the vertical sweep generator 129 over potentiometer 127 are of an increased negative value to effect reduced conductivity of tube section 500B and a slower capacitor discharge, whereby an output signal of decreased amplitude is coupled to the vertical sweep stage 525.

The vertical sweep output circuit 525 (FIG. 13) is operative to convert the voltage wave form signal output of the sawtooth generator 466 to a current wave, and is adapted to be energized over the terminals on terminal block 530, the energizing potentials being applied over terminals 531, 535, 538 by the system power supply source, and being controlled in its operation by the input signals received over terminal 537 from the vertical sawtooth generator 466. The output signals are applied to the flying spot scanner tube over terminal 534.

The vertical sweep stage 525 comprises a first amplifier arrangement including three twin triode devices 542, 552, and 560 connected in parallel to increase the current output of the circuit. Anodes 543, 546, 553, 556, 561, 564 are connected over the primary winding 571 of transformer 570. Resistor 549 is connected between the control grid circuits and ground, and the cathode circuits are coupled over adjustable resistor 550 and parallel capacitor 551 to ground.

Resistor 567 and capacitor 568 are connected across primary winding 571 of transformer 570, the secondary winding 572 of transformer 570 being connected to output terminal 534 to provide the resultant current wave form signal which appears therein to the vertical deflection yoke of the flying spot scanner. Capacitors 574, 575 are connected between the second terminal of secondary winding 572 and ground. Capacitor 573 is connected between B+ supply source and ground. Filament voltage is applied over terminals 535, 538 to effect the energization of filaments 587—589 respectively. The values of the components of an operative embodiment are set forth in the following chart:

VERTICAL SWEEP FOR FLYING SPOT SCANNER

| | |
|---|---|
| Pot. 550 | 5K 2 w. |
| R549 | 2.2M ½ w. |
| R567 | 27K ½ w. |
| C575 | 1000 µf. 25 v. |
| C574 | 1000 µf. 25 v. |
| C573 | 20 µf. 350 v. |
| C551 | 100 µf. 50 v. D.C. |
| C568 | .068 µf. 400 v. |

In operation, as the generated sawtooth output signals representative in value of the altitude are applied over input terminal 537 to the control grids of the amplifier tubes 542, 552, 560, the tubes are operative in the conventional manner to provide an amplified signal output, the amplifier being operative in the disclosed embodiment to provide in response to an input signal of 30 volts, an output signal in the order of 400 volts, the specific nature of such signals being indicated by the schematic block illustrations of FIGURE 13. As such signal is applied to the primary winding of the matching transformer 570 a corresponding signal is introduced in the secondary and applied over terminal 534 to the vertical deflection yoke for the flying spot scanner 231, the signal being of an increased current value as now reproduced while yet being indicative in its potential value of the aircraft altitude.

As the aircraft is at low altitudes and a signal of relatively large value is coupled to the vertical sweep generator 129, the output signal of the vertical sawtooth generator 461 will be of an increased amplitude and as coupled over the vertical sweep stage, 525 will provide a raster trace of increased vertical height (FIGURE 1a). If the aircraft is at a relatively high altitude, a signal of a relatively small value is coupled to the vertical sweep generator 129, and the output signal of the vertical sawtooth generator 466 will be of a decreased amplitude, and as coupled over the vertical sweep stage 525 will result in a raster of a reduced trace of a reduced vertical dimension (FIGURE 1b).

It is apparent that the horizontal generator 130 and vertical generator 129 are thus controlled by altitude representative signals to adjust the size and shape of the raster in a manner which is related to the value of the altitude signals.

*Raster Compensation for Pitch and Altitude Variations*

In the foregoing description the generation of indication signals for presentation on the associated display device were considered in conditions wherein the pitch and azimuth angles were equal to zero. In such presentation, any transformation assumes the use of a grid depicting a non-unique surface. The horizon line and each cardinal point in the presentation, however, are unique and identifiable. If the transformation occurs with the horizon and the cardinal points at the center of the display the symmetry of the line structure is such that no compensation is required.

In the event of a change in the pitch attitude of the aircraft, or the heading of the aircraft, the horizon line (or the cardinal point) will be adjusted away from the center of the transformation. Ostensibly, as the raster is expanded and compressed for the purpose of providing a moving representation of the aircraft speed, the relative position of the cardinal point or the horizon in the raster presentations as compressed and as expanded will no longer have the same proportional distances from the edge of the raster. According to the invention, therefore, a compensating signal is coupled to the deflection coils of the cathode ray tube of the flying spot scanner tube which is of a value to maintain the cardinal point and the horizon at the same position relative to the edge of the raster during the period of expansion and contraction of the raster.

Such compensation is basically achieved by introducing motion to the center of the readout raster, which motion is derived from the sawtooth waveform output of the speed generator circuit 130, and which has the same repetition rate as such circuit. With reference to FIGURES 14 and 15, the circuits there shown are operative to effect the raster shift with changes in azimuth and pitch respectively by an amount which is related to the adjustment of the raster shape by the speed representation signals.

As generally shown in FIGURE 7, a signal indicative of the heading of the aircraft is derived from the directional gyro 120 of the ship and is coupled over azimuth input circuit 120' to control the relative position of sphere 11, and is also coupled over an azimuth compensating stage 134 which is operative to effect a raster shift in accordance with the relative adjustment of the raster size which is effected by the speed sawtooth generator 114. The pitch compensating stage 137 is operative in a similar manner to couple a compensating signal to the vertical coils 132 of the flying spot scanner tube 31 which is related to the pitch attitude of the aircraft for the purpose of effecting a raster shift which is related to the change of raster size, such signal being coupled to stage 137 by the vertical gyro 121 and pitch input circuit 121'.

*Azimuth Compensating Stage*

With reference to FIGURE 14, a specific embodiment of the azimuth compensating stage is set forth thereat. As there shown the azimuth compensating stage comprises a terminal block 600 including terminals 601—606 over which control energizing signals and energizing potentials are coupled to the operating units of the stage. Briefly terminal 601 supplies chassis ground to the stage; terminal 602 provides 6.3 volt, 400 cycle current for the stage chopper circuit 610; terminal 603 couples control signals from the azimuth sensor device to the shift relay 645 indicating the direction of change of azimuth; terminal 604 couples the input signals from the speed sawtooth generator 114 to the azimuth compensating stage 134; terminal 605 couples the compensatory output sawtooth wave generated by the stage 134 to the horizontal deflection coils 131; and terminal 606 provides B+ 300 volt potential for the tube elements of the azimuth compensating stage.

The operating elements of the azimuth compensating stage 134 basically comprise a chopper stage 610; a push-pull amplifier stage 619; a voltage step down transformer 630; a rectifier circuit 635; a filter circuit 640; and a sign change circuit 644.

In operation, the input sawtooth signals are coupled over voltage divider circuit 616, 616' to the chopper stage 610, the amplitude of the signals being varied by adjustment of the potentiometer member 616' by the azimuth input circuit 120' (FIGURE 7). That is, with changes of heading from a cardinal point the azimuth input circuit 120' effects adjustment of the speed sawtooth signal to correspondingly different amplitudes to thereby effect the related azimuth adjustment. The chopper stage 610 may comprise chopper relay 612 which is coupled over terminal 602 to a source of 400 cycle current, and which is operative at its contacts 613, 614 to impress the input sawtooth direct-current signals at a high frequency alternately to the two tubes of the push-pull amplifier stage 619.

The amplifier stage 619 may comprise a twin section triode vacuum tube 620 which may be of the type which is commercially available as a 12BH7, having a first section 620A and a second section 620B connected in the manner of a push-pull amplifier. Briefly the amplifier stage 619 comprises a first tube section 620A having a plate 621 coupled over a portion of the primary winding 631 of transformer 630 to 300 volt B+ potential; a control grid 622 coupled to the output of the chopper stage 610 and also over grid resistor 617 to ground; and cathode 623 which is coupled over capacitor 627 and resistance 628 to ground. The second section section of the twin triode tube 620B comprises an anode 624 connected over the center tap of primary winding 631 of transformer 630 and terminal 606 to B+ 300 volt potential; control grid 625 connected over resistance 618 to ground, and cathode 626 connected over resistance 628 and capacitance 627 to ground.

The output of the chopper stage 610 which is proportional to the instantaneous value of the sawtooth signal is amplified by the push-pull amplifier stage 619 in the coventional manner, and is coupled to the primary winding 631 of transformer 630 to provide a signal in the secondary winding 632 of a reduced voltage value and an increased current value. The output signal is rectified by a full wave rectifier unit 636–639; filtered by the filter circuit 640 including inductance 643, capacitors 641, 642, which smooth the signal ripple; and coupled over contacts 646, 649 of relay 645 in the sign change circuit 644 to output terminal 605 and the horizontal deflection coils 131 of the flying spot scanner tube 31.

In that the duration and value of the input signal which is coupled to the azimuth compensating circuit is derived from the speed sawtooth generator circuit 114, and is of an amplitude which varies with the degree of change of heading from a cardinal point, the azimuth compensating stage 134 effects the coupling of a signal to the horizontal deflection coils 131 of a value which effects a corresponding adjustment of the cardinal points on the raster presentation as the raster is compressed and expanded to effect movement of the grid lines across the screen.

In that the cardinal point may move to the right or left of the center point the polarity of the compensating signal provided by the azimuth compensating circuit must be adjusted in a similar manner. To this end raster shift circuit 644 includes a shift relay 645 which at its contacts 646, 648 provides an output signal of a first polarity, and at its contacts 647, 649 provides an output signal of the opposite polarity in an obvious manner. The control signal for the raster shift relay is coupled thereto over terminal 603 by the azimuth sensor requipment 120, 120' (FIGURE 7).

*Pitch Compensating Stage*

With reference to FIGURE 15, a specific embodiment of the pitch compensating stage 137 is shown thereat. As there shown the stage basically comprises a terminal block 650 over which control signals and energizing potentials are coupled to the pitch compensating stage 137. Briefly, terminal 651 couples 400 cycle 6.3 volt operating power to the chopper stage 660; terminal 652 couples filament potential to the filaments 679, 629 for the vacuum tubes of the azimuth compensating stage 134 and pitch compensating stage 137; terminal 653 couples an output signal of the speed sawtooth generator 114 which is modified by pitch input stage 121' (FIGURE 7) and coupled to the chopper stage 137; terminal 654 connects the stage 137 to chassis ground, terminal 654' couples the sign change signal indicating the direction of change of pitch as provided by the pitch input circuit 121'; terminal 655 couples the output of the pitch compensating stage 137 to the vertical deflection coils 132 of the flying spot scanner tube 31; terminal 656 provides a control signal for relay 710 to effect discharge of filter circuit 69; terminal 657 provides a negative bias for control tube 700; and terminal 658 couples B+ potential to the vacuum tubes in the compensating stage 137.

The pitch compensating stage 137 is similar to azimuth compensating stage 134 and additionally includes a filter discharge circuit 700. Pitch input circuit 121' is responsive to changes in pitch of the aircraft to effect a corresponding adjustment of the amplitude of the sawtooth wave which is coupled to the compensating stage over terminal 653 by the speed sawtooth generator. The remaining components correspond to the components of the azimuth compensating stage 134, and accordingly reference is made thereto for a more detailed description of the circuit operation. Briefly, chopper unit 662 in chopper stage 660 is operative at its contacts 663, 664 to modulate the incoming D.C. sawtooth signal (which has an amplitude related to the pitch of the aircraft) with an alternating current component and to couple same to the control grids of the push-pull amplifier stage 669, which in turn couples a signal of reduced voltage and increased current over the secondary windings 682 of transformer 680 to a rectifier circuit 685. The rectified signal is filtered by filter circuit 690 and coupled over sign change circuit 694 to the output terminal 655 which is connected to the vertical deflection coils 132 of the flying spot scanner tube 31.

The sawtooth waveform output of the pitch compensating circuit 137 is related in amplitude to the pitch of the aircraft, and in time and amplitude to the speed sawtooth generator signal which controls the expansion and contraction of the raster on the flying spot scanner tube. Accordingly the output signal of the compensating stage 137 as coupled to the vertical deflection coils of the scanner tube maintains the relative position of the horizon in the raster presentations as the raster is compressed and expanded to provide an indication of speed of movement on the display device.

The sign change circuit 694 is operative in the manner of sign change circuit 644 to effect the provision of signals of opposite polarities in accordance with the direction of movement of the horizon on the display above and below its normal position in level flight.

The pitch compensating stage 131 further includes a discharge circuit 700 which is operative to provide a vertical trailing edge for the sawtooth signal output of the stage. That is, the discharge circuit in its operation effects a rapid discharge of the capacitors 691, 692 of the filter circuit 690 in the pitch compensating stage 137 to thereby provide a substantially vertical trailing edge for the output sawtooth signal.

Briefly, discharge circuit 700 comprises one section of a twin triode tube 700', which may be of the type commercially available as a 5963 which includes an anode 701 connected over relay 710 and resistor 712 and terminal 658 to 300 volt B+ potential; a control grid 702 connected over a resistor 707 and terminal 657 to a negative bias source, the bias normally maintaining the tube in a non-conductive condition, and also over resistor 706 and terminal 656 to an air speed blanking circuit which provides a control signal immediately subsequent to each cycling of the flying spot scanner raster from its full size to its reduced size (see FIGURES 1*l*–1*n*) and also over resistor 705 to ground; cathode 703 is connected to ground; and filament 704 is coupled over terminal 651 to 6.3 volt potential.

Relay 710 at its contacts 711 selectively completes the discharge circuit for capacitors 691, 692 over resistors 713, 714 to ground. Briefly, control tube 700' is normally non-conductive, and relay 710 is restored. With receipt of an air speed discharge signal over terminal 656 immediately subsequent to reduction of the scanner tube raster to its smaller size (FIGURE 1*n*), control grid 702 is driven positive, and control tube 700' is rendered sufficiently conductive to effect operation of relay 710. Relay 710 operates, and at its contacts 711 completes a discharge circuit for the capacitors 691, 692 to effect a rapid discharge thereof, and thereby a substantially vertical trailing edge for the output sawtooth signal. As the air speed discharge signal is removed from the terminal 656 following flyback of the raster to its full size (FIGURE 1), the control tube 700' is rendered non-conductive by the negative bias signal coupled over terminal 657 and resistor 707 to control grid 702. Relay 710 restores, and at its contacts 711 interrupts the discharge circuit for capacitors 691, 692.

HORIZONTAL AND VERTICAL RASTER SHIFTER

Synchroverter switch 612.

T630, 680.

| | |
|---|---|
| R712 | 68K ½ w. |
| R713 | 5.6Ω 1 w. |
| R705 | 1M ½ w. |
| R707 | 1.5M ½ w. |
| R714 | 5.6Ω 1 w. |
| R706 | 68K ½ w. |
| R678 | 1K 2 w. |
| Pot. 666 | 1M. |
| R665 | 1M ½ w. |
| R663 | 1M ½ w. |
| R667 | 1M ½ w. |
| R628 | 1K 2 w. |
| Pot. 616' | 1M. |
| R616 | 1M ½ w. |
| R618 | 1M ½ w. |
| R617 | 1M ½ w. |
| Coil 640, 690 | 450 mhy. 90. |

Silicon diode 636—639.
Silicon diode 686—689.

| | |
|---|---|
| C692 | 25µf. 50 v. |
| C691 | 10µf. 50 v. |
| C677 | 10µf. 50 v. |
| C642 | 25µf. 50 v. |

HORIZONTAL AND VERTICAL RASTER SHIFTER—Con.

| | |
|---|---|
| C641 | 10 µf. 50 v. |
| C627 | 10µf. 50 v. |

Conclusion

The novel visual indication generator provides a set of visual indications which enables the pilot of an aircraft to rapidly determine basic flight information by reference to a visual indication display device which is conveniently located in the operational area of the aircraft. Such visual display includes indications of the aircraft altitude, azimuth, roll and pitch attitudes as well as the aircraft speed integrated into a single display which closely approximates true world conditions, whereby readout of the indications is more expeditiously effected by the pilot with an increased margin of safety. The reliable nature of the equipment and the comprehensiveness of the integrated indications which are thus provided substantially reduces the possibilities of pilot error in flight and makes flight more safe under all types of weather conditions. It is further apparent that the novel display equipment has similar utility in flight simulator units which are used in the training of pilots, the signal inputs from the aircraft sensing units in such arrangement being replaced by signals from the simulator equipment.

While what is described is regarded to be a preferred embodiment of the invention, it will be apparent that variations rearrangements, modifications and changes may be made therein without departing from the scope of the present invention as defined by the appended claims.

What is claimed is:

1. In a visual indicator for providing a visual indication on an electronic display device representative of movement of a unit about different ones of its axes, datum representing means, means for providing a signal set characteristic of the attitude of the unit relative to said axes, means for transmitting said signal set to said datum representing means to control same to move the area which provides a visual presentation of the informative data represented by said signal set to a preselected position, scanner means located at said position operative to scan an adjacent area which is less than the whole area on said datum representing means including means operative to integrate the data on said scanned area on said datum representing means into an electrical signal set for display on said display device, means for providing signals characteristic of at least a first translatory motion, and means for applying said electrical signal set to said scanner means to control the scanner means to effect a variation in the size of the area scanned by the scanner means with changes in the value of the characteristic signals to thereby impart a motion simulating component to at least certain of the data in the display, and means for coupling the signal output of said scanner means to said display device.

2. In a visual indicator for providing a visual indication on an electronic display device representative of movement of a unit about different ones of its axes, datum representing means operative to provide a visual presentation of a sky, a horizon and a ground portion, a first means on said unit for providing a first signal set characteristic of the attitude of the unit relative to said axes, means for transmitting said signal set to said datum representing means to control same to adjust to a predetermined position the sky, horizon and ground portions thereon which indicate the existing attitudes of the unit relative to said axes, scanner means located at said position operative to scan the attitude data on an adjacent area of said datum representing means including means for generating an electrical signal set during each scan for effecting display of said data in said area on said electronic display device, a second means for providing translatory motion characteristic signals of different values to characterize different translatory motions, and means in said scanner means operatively controlled by said translatory motion characteristic signals to vary the dimensions of the area scanned with changes in the value of the signals to thereby impart a motion simulating component to at least certain of the data in the display provided by said data representing means.

3. In a visual indicator for providing a visual indication on an electronic display device of movement of a mobile unit about different ones of its axes, datum representing means operative to provide a visual presentation of a sky, a horizon and a ground portion; sensor means on said mobile unit for providing a signal set indicative of the pitch and azimuth condition of the mobile unit, means for transmitting said signal set to said datum representing means to control same to move the area of the sky, horizon and ground portions thereon which is representative of the existing pitch and azimuth attitudes of the unit as determined by said sensor means to a predetermined position, means located adjacent said second position operative to electrically sample the conditions of attitude as indicated by said datum representing means at such position and to integrate the information into an electrical signal set for simultaneous display on said electronic display device, and means operative to vary the dimensions of the area sampled to provide corresponding variations in the data presentation on said display device.

4. In a visual indicator for providing a visual indication on an electronic display device representative of movement of a unit about different ones of its axes, datum representing means operative to provide a visual representation of a sky, a horizon and a ground portion; means on said unit including a first and a second means for providing a signal set characteristic of the pitch and azimuth attitudes of the unit, means for transmitting said signal set to said datum representing means to control same to move the sky, horizon and ground portions thereon to a predetermined position to indicate the existing pitch and azimuth attitudes of the unit as determined by said first and second means, scanner means operative to integrate the conditions of attitude as characterized by said datum representative means at said position into an electrical signal set for display on said electronic display device, a third means for providing a signal set characteristic of the roll attitude of the unit, control means on said display device operatively controlled by said last signal set to electronically rotate the display on said display device through an angle which is related to the roll attitude of the unit, means for providing an electrical signal set characteristic of translatory motion of the unit along at least one of said axes, and means in said scanner means controlled by variations in the value of said electrical signal set to scan areas of correspondingly different dimensions to thereby impart a motion simulating component to at least certain of the data on said display.

5. In a visual indicator for providing a visual indication on an electronic display device representative of movement of a unit, an attitude indicating device having different attitude indicating sets of information disposed thereon mounted for rotation about different ones of each of a plurality of axes, scanning means including a first means operative to periodically vary the dimension of the area scanned on said indicating device to impart translatory motion to at least certain of the data on the display, and means for generating signals representative of the information disposed on the area scanned by said first means, means connected to operate said attitude indicating device to different positions to present different areas on said device to said scanning means, the area presented thereto being characteristic of the attitude of the unit relative to said axes, means for providing a set of signals which are characteristic of the rate of movement of the unit along one of said axes, and means for applying said signals to said first means in said scanning means to control same to adjust the rate of variation of the dimensions of the area scanned to a value characteristic of the rate of movement of the unit.

6. In a visual indication signal generator for a mobile unit, an attitude indicating device comprising a sphere-like member having different attitude indicating sets of information disposed on the outer surface thereof including a horizon which laterally bisects the sphere and a ground portion below the horizon comprised of a first and a second set of lines, each of which sets converge at different predetermined spaced points on the horizontal to provide a pattern of crossed grid lines on the ground portion, support means for mounting said sphere for rotation about different ones of each of a plurality of axes, scanning means operative to scan an area on said indicating device including means for generating signals representative of the information disposed on the area scanned by the scanning means, and sensor means connected to operate said attitude indicating device to different positions to present different areas on said device to said scanning means, the area presented thereto being indicative of the attitude of the mobile unit relative to said axes.

7. A visual indication signal generator as set forth in claim 6 in which said mounting means includes means for journalling said sphere for rotation about a lateral axis, and sensor means operative to rotate said sphere-like member about said axis through an angle consistent with the degree of displacement of the mobile unit about the pitch axis of the mobile unit, the cross grid lines presented to said area being successively more square in configuration as the pitch displacement approaches ninety degrees.

8. A visual indication signal generator as set forth in claim 6 in which said scanning means is operative responsive to a zero pitch attitude condition of the mobile unit to scan an area which includes the horizon located in the approximate center of the area, and in which said support means includes means for supporting said sphere for rotation about a lateral axis, and said sensor means includes pitch responsive means operative to adjust said sphere about said lateral axis through an angle consistent with the degree of change of pitch of the mobile unit, whereby the horizon is adjusted to a correspondingly different vertical position relative to said scanning area.

9. A visual indication signal generator as set forth in claim 6 in which the upper portion of the sphere-like member is separated from the horizon and the lower portion by a blank strip area, and in which said scanning means and said sphere-like member are adjusted with the mobile unit in level attitude to scan an area for reproduction on said display device including the cross-grid ground portion, the horizon line, and said blank strip portion.

10. A visual indication signal generator as set forth in claim 9 in which the upper portion of the sphere-like member includes a cross-grid surface formed by the extension of the lines on the lower portion of the sphere-like member, and the portions of the lines which extend over the lower portion of the sphere are solid, and the portion which extends on the upper portion of the sphere are broken, and which includes means for adjusting different portions of said sphere into said scanning area responsive to changes of pitch of said mobile unit, an increasingly larger section of the upper dotted line portion being moved into said area with operation of the mobile unit to a climbing attitude, and an increasingly larger section of said lower dotted line portion being moved into said scanning area with operation of said mobile unit to a diving attitude.

11. In a visual indication signal generator for a mobile unit, an attitude indicating device comprising a sphere-like member having different attitude indicating sets of information disposed on the outer surface thereof including a horizon which laterally bisects the sphere, a first set of great circle lines including a first major line which extends through the poles of the sphere and a pair of points on the horizon spaced 180° apart, and a plurality of lines successively spaced on either side of said first major line, each of which extends through said pair of horizon points; and a second set of great circle lines including a second major line which extends through said poles and a second pair of points on said horizon, each of which is located ninety degrees from each point of said first pair, and a plurality of lines which are successively spaced on each side of said second major line, each of which extends through said second pair of points; support means for mounting said sphere for rotation about different ones of a plurality of axes, scanning means operative to scan an area on said indicating device including means for generating signals representative of the information disposed on the area scanned by the scanning means, and sensor means connected to operate said attitude indicating device to different positions to present a different area on said device to said scanning means, the area presented thereto being indicative of the attitude of the mobile unit relative to said axes.

12. In a visual indication signal generator for providing a display on a display device representative of the relative position of a mobile unit about different ones of its axes, an attitude indicating device mounted for rotation about different ones of a plurality of axes having different attitude indicating sets of information disposed thereon, scanning means operative to scan an area on said indicating device including means for generating signals representative of the information disposed on the area scanned by the scanning means, sensor means including a first sensor means operative to provide a signal set to operate said attitude indicating device to different positions to present different areas on said device to said scanning means, the area presented thereto being indicative of the attitude of the mobile unit relative to said axes, a second sensor means for providing a signal set representative of variations in height relative to a given reference plane, and control means operatively controlled by said last signal set to adjust said scanning area to different sizes, whereby the size of the information displayed is varied with changes in height of the mobile unit.

13. In a visual indication signal generator for providing a display on a display device representative of the relative position of a mobile unit about different ones of its axes, an attitude indicating device having different attitude indicating sets of information disposed thereon, scanning means operative to scan an area on said indicating device including means for generating signals representative of the information disposed on the area scanned by the scanning means for transmitting to said display device, sensor means for providing a signal set representative of variations in height of the mobile unit relative to a given reference plane, and control means operatively controlled by said signal set to adjust said scanning area to correspondingly different sizes, whereby the size of the information displayed on said device is varied with changes in height of the mobile unit relative to said reference plane.

14. In a visual indication signal generator for providing a display on a display device representative of the movement of a mobile unit about different ones of its axes, an attitude indicating device mounted for rotation about different ones of a plurality of axes having different attitude indicating sets of information disposed thereon, scanning means operative to scan an area on said indicating device including means for generating signals representative of the information disposed on the area scanned by the scanning means for transmission to said display device, sensor means including a first sensor means operative to provide a signal set to operate said attitude indicating device to different positions to present different areas on said device to said scanning means, the area presented thereto being indicative of the attitude of the mobile unit relative to said axes, a second sensor means for providing a signal set representative of variations in height relative to a given reference plane, and control means operatively controlled by said last signal set to adjust said scanning area to a successively smaller size in at least one dimension and to a successively larger size in at least one other dimension responsive to movement of the mobile unit to different distances from said reference plane, whereby the signals generated by said scanning means for coupling to said display device represent changes in height of the mobile unit.

15. In a visual indication signal generator for a mobile unit, an attitude indicating device mounted for rotation about different ones of a plurality of axes and having different attitude indicating sets of information disposed thereon, scanning means operative to provide a scanning raster for scanning an area on said indicating device, including means for generating signals representative of the information disposed on the area scanned by said raster; sensor means including a first sensor means operative to provide a signal set to operate said attitude indicating device to different positions to present different areas on said device to said scanning means, the area presented thereto being indicative of the attitude of the mobile unit relative to said axes, a second sensor means for providing a signal set representative of variations in height relative to a given reference plane; and control means operative to adjust the width and height of said raster to correspondingly different values with changes in the value of said last signal set including a first control means for reducing the width of said raster as the mobile unit is moved closer to said reference plane, and a second control means for simultaneously increasing the height of said raster.

16. In a visual indication signal generator for a mobile unit, an attitude indicating device mounted for rotation about different ones of a plurality of axes and having different attitude indicating sets of information disposed thereon, scanning means including a flying spot scanner unit having vertical and horizontal coils for providing a scanning raster to scan an area on said indicating device, and means operative to generate signals representative of the information disposed on the area scanned by said raster; pitch and azimuth sensor means operative to provide a signal set for operating said attitude indicating device to different positions to present to said scanning means the area on said device which indicates the attitude of the mobile unit relative to said axes, an altitude sensor means for providing a signal set representative of variations in height relative to a given reference plane, and control means operatively controlled by said last signal set to adjust the dimensions of said scanning raster to different sizes with changes of height of the mobile unit including a first means connected to vary the signal input to the vertical deflection coil of said flying spot scanner unit to vary the height of said raster responsive to changes in altitude of the mobile unit, and a second means connected to vary the signal input to the horizontal deflection coil of said flying spot scanner unit to vary the width of said raster responsive to changes in attitude of the mobile unit.

17. In a visual indication signal generator for a mobile unit as set forth in claim 16, said first means comprising a signal generator stage connected to provide a series of output signals having an amplitude related to the value of the signal provided by said altitude sensor means, a vertical sawtooth generator stage operatively controlled by said output signals of said signal generator stage to provide a set of sawtooth signals having an amplitude related to the altitude of the mobile unit, and a coupling stage controlled by said sawtooth generator stage for transmitting a signal set to said vertical deflection coil which signals are related in amplitude to said sawtooth signals to control said flying spot scanner unit to provide a raster of a related height.

18. In a visual indication signal generator for a mobile unit as set forth in claim 14, said second means comprising a sawtooth generator stage connected to provide a series of sawtooth signals having an amplitude related to the value of the signal provided by said altitude sensor means, and a coupling stage controlled by said sawtooth generator stage for transmitting a sawtooth signal set to said horizontal deflection coil to control said flying spot scanner unit to provide a raster of a related width.

19. In a visual indication signal generator for producing visual indications on a display device related to the attitude of a mobile unit, an indicating device having a pattern of symbols disposed thereon for indicating different sets of information, scanning means operative to scan an area on said indicating device including means for generating signals representative of the information disposed on the area scanned by the scanning means, means for transmitting signals representative of the scanned pattern to said display device for reproduction thereon, speed sensor means for providing signals representative of the speed of the mobile unit, and control means operatively controlled by the speed representative signals to effect movement of the symbols of the pattern across said display device at a rate which is related to the speed of the mobile unit.

20. In a visual indication signal generator for producing visual indications on a display device related to the attitude of a mobile unit, an attitude indicating device having different attitude indicating sets of information disposed thereon mounted for rotation about different ones of a plurality of axes, scanning means operative to scan an area on said indicating device including means for generating signals representative of the information disposed on the area scanned by the scanning means, sensor means including a first sensor means operative to provide a signal set to move said attitude indicating device to different positions to present different areas on said device to said scanned area, the area presented thereto providing a pattern including symbols indicative of the attitude of the mobile unit relative to said axes, means for transmitting signals representative of said pattern to said display device for reproduction thereon, speed sensor means for providing signals representative of the speed of the mobile unit, and control means operatively controlled by the speed representative signals to effect movement of the symbols of the pattern across said display device at a rate which is related to the speed of the mobile unit.

21. In a visual indication signal generator for producing visual indications on a display device related to the attitude of a mobile unit, an attitude indicating device having different attitude indicating sets of information disposed thereon mounted for rotation about different ones of a plurality of axes, scanning means including a flying spot scanner tube operative to effect a raster scan of an area on said indicating device including means for generating signals representative of the information disposed on the area scanned by the scanning means, sensor means including a first means operative to provide a signal set to move said attitude indicating device to different positions to present different areas on said device to said scanned area, the area presented thereto providing a pattern including symbols indicative of the attitude of the mobile unit relative to said axes, means for providing signals representative of the scanned pattern to said display device for reproduction thereon, speed sensor means for providing signals representative of the speed of the mobile unit, and motion control means operatively controlled by the speed representative signals to effect movement of the symbols of the pattern as reproduced on said display device at a rate which is related to the speed of the mobile unit including raster control means for controlling said scanner tube to initially effect a raster scan of a first given size and thereafter to reduce the dimension of each successive raster scan in the direction of a second predetermined size at a rate which is related to the speed of the mobile unit.

22. A visual indication signal generator as set forth in claim 21 in which said raster control means include a speed sawtooth generator stage operative to provide a speed sawtooth signal having a time duration which is related to the speed of the mobile unit as indicated by said speed sensor signals, and power supply means controlled by said sawtooth signal to provide a high voltage sawtooth signal of a time duration related to said speed sawtooth signal for energizing the target of said flying spot scanner tube.

23. A visual indication signal generator as set forth in claim 21 in which said device includes a synchronized generator operative to provide a synchronizing signal for each raster trace of the display device and said flying spot scanner, and in which said speed sawtooth generator stage includes a synchronization stage operatively controlled by said synchronizing signal output of said sync generator to initiate each speed sawtooth signal simultaneously with the initiation of a raster trace on said display device and on said flying spot scanner unit.

24. In a visual indication signal generator as set forth in claim 21, said sensor means comprising pitch sensor means for rotating said attitude indicating device about a first axis responsive to changes in the pitch attitude of the mobile unit, and pitch compensating means operative to provide a compensating signal to the horizontal deflection coil of the flying spot scanner tube to maintain a consistent pattern on said display device responsive to a simultaneous change of size of said raster and a change of pitch.

25. In a visual indication signal generator as set forth in claim 21, said sensor means comprising azimuth sensor means for rotating said attitude indicating device about a second axis responsive to changes in the azimuth attitude of the mobile unit, and an azimuth compensating means operative to provide a compensating signal to the vertical deflecting coil of the flying spot scanner tubes to maintain a consistent pattern on said display device responsive to simultaneous change of azimuth and a change of size of said raster.

26. In a visual indication signal generator for producing visual indications on a display device related to the attitude of a mobile unit, an attitude indicating device having different attitude indicating sets of information disposed thereon mounted for rotation about different ones of a plurality of axes, scanning means operative to scan an area on said indicating device including means for generating signals representative of the information disposed on the area scanned by the scanning means, sensor means including pitch and azimuth sensor means operative to provide a signal set to move said attitude indicating device to different positions to present different areas on said device to said scanned area with changes in pitch and azimuth, the area presented thereto providing a pattern including symbols indicative of the pitch and azimuth attitude of the mobile unit relative to said axes, means for transmitting an information signal set representative of said scanned pattern to said display device for reproduction thereon, altitude sensor means for coupling signals to said scanning device to adjust the shape and dimension of said area to different sizes to thereby integrate changes in altitude into said information signal set, speed sensor means for providing signals representative of the speed of the mobile unit, control means operatively controlled by the speed representative signals to incrementally vary the size of said area on successive scans at a rate related to said speed, to thereby effect movement of the symbols of the pattern across said display device at a rate which is related to the speed of the mobile unit; and roll sensor means operative to control adjustment of the display about its center responsive to changes to the roll attitude of the mobile unit.

References Cited in the file of this patent

UNITED STATES PATENTS

| | | |
|---|---|---|
| 2,053,182 | Crane et al. | Sept. 1, 1936 |
| 2,280,797 | Crane | Apr. 28, 1942 |
| 2,636,161 | Hoover | Apr. 21, 1953 |
| 2,871,699 | Kenyon | Feb. 3, 1959 |

FOREIGN PATENTS

| | | |
|---|---|---|
| 871,127 | France | Jan. 3, 1942 |
| 742,983 | Great Britain | Jan. 4, 1956 |

UNITED STATES PATENT OFFICE

CERTIFICATE OF CORRECTION

Patent No. 3,037,382　　　　　　　　　　　　　June 5, 1962

Douglas G. Aid et al.

It is hereby certified that error appears in the above numbered patent requiring correction and that the said Letters Patent should read as corrected below.

Column 34, line 69, for the claim reference numeral "14" read -- 16 --.

Signed and sealed this 27th day of November 1962.

(SEAL)
Attest:
ESTON G. JOHNSON
XKRNKSKXWXXSWXDKR
Attesting Officer

DAVID L. LADD
Commissioner of Patents